(12) United States Patent
Zhamu et al.

(10) Patent No.: US 9,208,920 B2
(45) Date of Patent: Dec. 8, 2015

(54) UNITARY GRAPHENE MATRIX COMPOSITES CONTAINING CARBON OR GRAPHITE FILLERS

(71) Applicants: Aruna Zhamu, Centerville, OH (US); Mingchao Wang, Fairborn, OH (US); Wei Xiong, Kettering, OH (US); Bor Z. Jang, Centerville, OH (US)

(72) Inventors: Aruna Zhamu, Centerville, OH (US); Mingchao Wang, Fairborn, OH (US); Wei Xiong, Kettering, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 13/694,468

(22) Filed: Dec. 5, 2012

(65) Prior Publication Data
US 2014/0154941 A1 Jun. 5, 2014

(51) Int. Cl.
| | |
|---|---|
| *H01B 1/04* | (2006.01) |
| *C01B 31/02* | (2006.01) |
| *B32B 9/00* | (2006.01) |
| *C04B 35/00* | (2006.01) |
| *B82Y 30/00* | (2011.01) |

(52) U.S. Cl.
CPC . *H01B 1/04* (2013.01); *B82Y 30/00* (2013.01); *Y10S 977/734* (2013.01); *Y10S 977/842* (2013.01); *Y10T 428/249955* (2015.04); *Y10T 428/292* (2015.01); *Y10T 442/2631* (2015.04)

(58) Field of Classification Search
None
See application file for complete search history.

(56) References Cited

U.S. PATENT DOCUMENTS

| | | | |
|---|---|---|---|
| 3,404,061 A | 10/1968 | Shane et al. | |
| 7,071,258 B1 | 7/2006 | Jang et al. | |
| 2009/0061191 A1* | 3/2009 | Zhamu et al. | 428/220 |
| 2010/0055025 A1* | 3/2010 | Jang et al. | 423/448 |
| 2010/0055464 A1* | 3/2010 | Sung | 428/408 |
| 2010/0085713 A1 | 4/2010 | Balandin et al. | |
| 2010/0140792 A1 | 6/2010 | Haddon et al. | |
| 2011/0108978 A1 | 5/2011 | Kim et al. | |

OTHER PUBLICATIONS

U.S. Appl. No. 10/858,814, filed Jun. 3, 2004, B. Z. Jang, et al.
U.S. Appl. No. 11/509,424, filed Aug. 25, 2006, B. Z. Jang, et al.
U.S. Appl. No. 11/784,606, filed Apr. 9, 2007, A. Zhamu, et al.
U.S. Appl. No. 13/385,813, filed Mar. 8, 2012, A. Zhamu, et al.
U.S. Appl. No. 13/694,161, filed Nov. 2, 2012, A. Zhamu, et al.
U.S. Appl. No. 13/694,162, filed Nov. 2, 2012, A. Zhamu, et al.
Edwards RS, Coleman KS., "Graphene Film Growth on Polycrystalline Metals," Accounts of Chem. Res. Aug. 15, 2012.

* cited by examiner

*Primary Examiner* — Jennifer Chriss
*Assistant Examiner* — Frank Vineis

(57) ABSTRACT

A unitary graphene matrix composite comprising: (a) a unitary graphene matrix containing an oxygen content of 0.001% to 10% by weight, obtained from heat-treating a graphene oxide gel at a temperature higher than 100° C. and contains no discrete graphene platelets derived from the graphene oxide gel; (b) a carbon or graphite filler phase selected from carbon or graphite fiber, carbon or graphite nano-fiber, carbon nanotube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof. The carbon or graphite filler phase is preferably in a particulate, filamentary, or rod-like form dispersed in and bonded by the unitary graphene matrix. This composite exhibits a combination of exceptional thermal conductivity, electrical conductivity, mechanical strength, surface hardness, and scratch resistance.

37 Claims, 19 Drawing Sheets

20 µm (Scale bar = 5 μm per interval)

Poly-crystalline graphene film from catalytic CVD (top view)

Single-grain (single crystal) graphene film (top view)

Graphene poly-crystal with incomplete grain boundaries (top view)
(essentially a graphene single crystal with defects)

UNITARY GRAPHENE MATRIX COMPOSITES CONTAINING CARBON OR GRAPHITE FILLERS

FIELD OF THE INVENTION

The present invention relates generally to the field of graphitic materials for heat dissipation applications and, more particularly, to a graphene matrix composite containing a graphene oxide-derived unitary graphene matrix material and a carbon or graphite filler or reinforcement phase dispersed in or bonded by the graphene matrix material. This unitary graphene matrix composite exhibits a combination of exceptionally high thermal conductivity, high electrical conductivity, high mechanical strength, good surface scratch resistance, and good hardness.

BACKGROUND OF THE INVENTION

Carbon is known to have five unique crystalline structures, including diamond, fullerene (0-D nano graphitic material), carbon nano-tube (1-D nano graphitic material), graphene (2-D nano graphitic material), and graphite (3-D graphitic material).

The carbon nano-tube (CNT) refers to a tubular structure grown with a single wall or multi-wall. Carbon nano-tubes have a diameter on the order of a few nanometers to a few hundred nanometers. Its longitudinal, hollow structure imparts unique mechanical, electrical and chemical properties to the material. CNT is a 1-D (one-dimensional) nano carbon or 1-D nano graphite material.

Bulk natural flake graphite is a 3-D graphitic material with each particle being composed of multiple grains (or graphite single crystals or crystallites) with grain boundaries (amorphous or defect zones) demarcating neighboring graphite single crystals. Each grain is composed of multiple graphene planes oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Consequently, a natural graphite particle composed of multiple grains of different orientations exhibits an average property between these two extremes. It would be highly desirable in many applications to produce a bulk graphite particle (containing single or multiple grains) having sufficiently large dimensions and having all graphene planes being essentially parallel to one another along one desired direction. For instance, it is highly desirable to have one large-size graphite particle (e.g. a unitary layer of multiple graphene planes) having the c-axis directions of all the graphene planes being substantially parallel to one another) and having a sufficiently large length/width for a particular application (e.g. >5 cm$^2$ for use as a heat-spreading sheet on a CPU of a smart phone). Thus far, it has not been possible to produce this type of large-size unitary graphene entity from existing natural or synthetic graphite particles.

The constituent graphene planes of a graphite crystallite can be extracted or isolated from a graphite crystallite to obtain individual graphene sheets of carbon atoms. An isolated, individual graphene sheet is commonly referred to as single-layer graphene. A stack of multiple graphene planes bonded through van der Waals forces in the thickness direction with an inter-graphene plane spacing of 0.335 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or NGP is a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted in October 2012; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

NGPs are typically obtained by intercalating natural graphite particles with a strong acid and/or oxidizing agent to obtain a graphite intercalation compound (GIC) or graphite oxide (GO), as illustrated in FIG. 1(a) (process flow chart) and FIG. 1(b) (schematic drawing). This is most often accomplished by immersing natural graphite powder (20 in FIGS. 1(a) and 100 in FIG. 1(b)) in a mixture of sulfuric acid, nitric acid (an oxidizing agent), and another oxidizing agent (e.g. potassium permanganate or sodium chlorate). The resulting GIC (22 or 102) is actually some type of graphite oxide (GO) particles. This GIC is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid expansion by a factor of 30-300 to form "graphite worms" (24 or 104), which are each a collection of exfoliated, but largely un-separated or still interconnected graphite flakes. A SEM image of graphite worms is presented in FIG. 2(a).

In Route 1A, these graphite worms (exfoliated graphite or "networks of interconnected/non-separated graphite flakes") can be re-compressed to obtain flexible graphite sheets or foils (26 or 106) that typically have a thickness in the range of 0.125 mm (125 μm)-0.5 mm (500 μm). One may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT) or the 2-D nano carbon material (graphene).

As disclosed by M. Smalc, et al, U.S. Pat. No. 7,292,441 (Nov. 6, 2007) and U.S. Pat. No. 6,982,874 (Jun. 3, 2006), and J. W. Tzeng, U.S. Pat. No. 6,482,520 (Nov. 19, 2002), these flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 2(b)). Many flakes are inclined with respect to one another at a very large angle (e.g. mis-orientation of 20-40 degrees).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm. In the present application, the thickness of multi-layer NGPs is typically less than 20 nm.

Route 2 entails ultrasonicating the graphite oxide suspension for the purpose of separating/isolating individual graphene oxide sheets from graphite oxide particles. This is based on the notion that the inter-graphene plane separation bas been increased from 0.335 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%40% by weight, more typically 0.01%-5% by weight.

For the purpose of defining the claims of the instant application, NGPs include single-layer and multi-layer graphene or reduced graphene oxide with an oxygen content of 0-10% by weight, more typically 0-5% by weight, and preferably 0-2% weight. Pristine graphene has essentially 0% oxygen. Graphene oxide (including RGO) can have 0.001%-46% by weight of oxygen. The graphene oxide gel, to be described in detail later, typically contains 20-46% by weight oxygen immediately after removal of the liquid from the GO gel, but prior to a subsequent heat treatment. The graphene oxide gel-derived unitary graphene layer or graphene single crystal of the present invention typically has an oxygen content of 0.01% to 5% by weight, more typically <<2% by weight. This graphene oxide gel-derived graphene material, reinforced with a filler phase (e.g. CNTs and carbon fibers), constitutes the presently invented unitary graphene matrix composite. This composite is made by forming a mixture of the filler particles with the GO gel (e.g. by impregnating a CNT mat with the GO gel or by dispersing the CNTs in a GO gel to form a slurry), followed by removal of liquid from the gel and heat-treatment of the resulting GO-filler solid mixture (for the purpose of reducing and re-graphitizing GO molecules). The heat treatment serves to chemically link GO molecules to form a 2-D or 3-D network of chemically bonded graphene molecules of essentially infinite molecular weights, and to drastically reduce the oxygen content of GO down to below 10% by weight, more typically <5%, further more typically <2%, and most typically <<1% (only trace amount if the heat treatment temperature is sufficiently high and heat treatment time sufficiently long).

It may be noted that flexible graphite foils (obtained by re-compressing or roll-pressing exfoliated graphite worms) for electronic device thermal management applications (e.g. as a heat spreader) have the following major deficiencies:

(1) As indicated earlier, flexible graphite (FG) foils exhibit a relatively low thermal conductivity, typically <500 W/mK and more typically <300 W/mK.

(2) Flexible graphite foils are also of low strength and poor structural integrity. The high tendency for flexible graphite foils to get torn apart makes them difficult to handle in the process of integrating them in a microelectronic device.

(3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 µm in lateral dimensions and >100 nm in thickness) can cause internal shorting and failure of electronic devices.

(4) For this reason, it is necessary to apply a protective resin coating onto a surface or on both surfaces of a flexible graphite foil in order to prevent graphite flakes from being released. This resin coating is typically not a thermally or electrically conductive material that is often an undesirable feature in a situation where high conductivity is required. In other situations where electrical insulation or isolation is required, this resin layer can present some issues (e.g. mis-match in coefficients of thermal expansion and elastic constants between the FG layer and the resin coating, resulting in delamination or peeling-off after some number of thermal cycles).

The presently invented unitary graphene layer itself and its carbon/graphite filler-reinforced version (the unitary graphene matrix composite) were invented to address the aforementioned issues and were surprisingly found to overcome essentially all of these problems associated with FG foils.

Other sheet-like graphitic materials that can be used as a heat spreader or thermal interface material include resin-free or resin-impregnated versions of carbon nano-tube (CNT) paper (e.g. Bucky paper), carbon fiber mat (e.g. carbon nano-fiber or CNF mat), and carbon paper (e.g. made of short carbon fibers). These graphitic sheets also suffer from similar shortcomings as FG foils. For instance, although individual CNT or CNF filaments alone can exhibit a high thermal conductivity (1,500-3000 W/mK), the resulting CNT or CNF paper or mat typically exhibit an in-plane thermal conductivity less than 100 W/mK and often less than 10 W/mK, likely due to the few and poor contacts between individual CNT or CNF filaments, providing insufficient cross-sections for electron flow or even impeding electron flow. Further, the contact between a sheet-like graphitic layer and a heat source is usually poor due to limited contact surfaces between such a graphitic layer (e.g. CNT paper) and a rigid device component (e.g. a CPU in a mobile phone). This results in an ineffective heat transfer between the heat source and the graphitic layer. Additionally, these mats or paper structures, if impregnated with a resin (e.g. epoxy) for improved strength and rigidity, actually exhibit even lower thermal conductivity and electrical conductivity.

Similarly, the NGPs (including discrete platelets of pristine graphene, GO, and GRO), when packed into a film or paper sheet (34 or 114) of non-woven aggregates, typically do not exhibit a high thermal conductivity. The thermal conductivity is found to be higher than 1,000 W/mK only when the film or paper is cast and pressed into a sheet having a thickness lower than 10 µm, and higher than 1,500 W/mK only when the film or paper is cast and greatly pressed into a sheet having a thickness lower than 1 µm (which is mechanically weak). This is reported in our earlier U.S. patent application Ser. No. 11/784,606 (Apr. 9, 2007). However, ultra-thin film or paper sheets (<10 µm) are difficult to produce in mass quantities, and difficult to handle when one tries to incorporate these thin films as a heat spreader material during the manufacturing of microelectronic devices.

In general, a paper-like structure or mat made from platelets of graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 3(b)), leading to relatively poor thermal conductivity, low electric conductivity, and low structural strength. These papers or aggregates of discrete NGP, GO or RGO platelets also have a tendency to get flaky, emitting conductive particles into air.

Our earlier application (U.S. application Ser. No. 11/784, 606) further disclosed a mat, film, or paper of NGPs infiltrated with a metal, glass, ceramic, resin, and CVD carbon matrix material (graphene being the filler or reinforcement phase, not the matrix phase). Subsequently, Haddon, et al (US Pub. No. 2010/0140792, Jun. 10, 2010) also reported NGP thin film and NGP-reinforced polymer matrix composites for thermal management applications. The processes used by Haddon et al to produce NGPs are identical to those disclosed much earlier by us (Jang, et al. U.S. patent application Ser. No. 10/858,814 (Jun. 3, 2004)). The NGP-reinforced polymer matrix composites, as an intended thermal interface material, have very low thermal conductivity, typically <<2 W/mK. The NGP films of Haddon, et al are essentially non-woven aggregates of discrete graphene platelets, identical to those of our earlier invention (U.S. application Ser. No. 11/784,606). Again, these aggregates have a great tendency to have graphite particles flaking and separated from the film surface, creating internal shorting problem for the electronic device containing these aggregates. They also exhibit low thermal conductivity unless made into thin films (10 nm-300 nm, as reported by Haddon, et al) which are very difficult to handle in a real device manufacturing environment. Balandin, et al (US Pub. No. 2010/0085713, Apr. 8, 2010) also disclosed a graphene layer produced by CVD deposition or diamond conversion for heat spreader application. More recently, Kim, et al (N. P. Kim and J. P. Huang, "Graphene Nanoplatelet Metal Matrix," US Pub. No. 2011/0108978, May 10, 2011) reported metal matrix infiltrated NGPs. However, metal matrix material is too heavy and the resulting metal matrix composite does not exhibit a high thermal conductivity.

Another prior art material for thermal management application is the pyrolytic graphite film. The lower portion of FIG. 1(a) illustrates a typical process for producing prior art pyrolitic graphitic films or sheets from a polymer. The process begins with carbonizing a polymer film 46 at a carbonization temperature of 500-1,000° C. for 2-10 hours to obtain a carbonized material 48, which is followed by a graphitization treatment at 2,500-3,200° C. for 5-24 hours to form a graphitic film 50. This is a slow, tedious, and energy-intensive process. Furthermore, carbonization of certain polymers (e.g. polyacrylonitrile) involves the emission of toxic species.

A second type of pyrolytic graphite is produced by high temperature decomposition of hydrocarbon gases in vacuum followed by deposition of the carbon atoms to a substrate surface. This is essentially a chemical vapor deposition (CVD) process. In particular, highly oriented pyrolitic graphite (HOPG) is the material produced by the application of uniaxial pressure on deposited pyrocarbon or pyrolytic graphite at very high temperatures (typically 3,000-3,300° C.). This entails a thermo-mechanical treatment of combined mechanical compression and ultra-high temperature for an extended period of time in a protective atmosphere; a very expensive, energy-intensive, and technically challenging process. The process requires high vacuum and ultra-high temperature equipment that is not only very expensive to make but also very expensive and difficult to maintain. Even with such extreme processing conditions, the resulting PG (including HOPG) still possesses many defects, grain boundaries, and mis-orientations (neighboring graphene planes not parallel to each other), resulting in less-than-satisfactory in-plane properties. Typically, the best prepared HOPG sheet or block remains far from being a graphite single crystal; instead, it typically still contains many grains or single crystals and a vast amount of grain boundaries and defects. In general, the PG or HOPG is free from any element than carbon.

Similarly, the most recently reported graphene thin film (<2 nm) prepared by catalytic CVD of hydrocarbon gas (e.g. $C_2H_4$) on Ni or Cu surface is not a single-grain crystal, but a poly-crystalline structure with many grain boundaries and defects [e.g., Edwards R S, Coleman K S., "Graphene Film Growth on Polycrystalline Metals," Accounts of Chem. Res. 2012 Aug. 15]. With Ni or Cu being the catalyst, carbon atoms obtained via decomposition of hydrocarbon gas molecules at 800-1,000° C. are deposited onto Ni or Cu foil surface to form a sheet of single-layer or few-layer graphene that is poly-crystalline. The grains are typically much smaller than 100 µm in size and, more typically, smaller than 10 µm in size. These graphene thin films, being optically transparent and electrically conducting, are intended for applications such as the touch screen (to replace indium-tin oxide or ITO glass) or semiconductor (to replace silicon, Si). However, these polycrystalline graphene films are not sufficiently thermally conducting (too many grains or too much grain boundaries, and all grains being oriented in different directions) and not sufficiently thick for use as a heat spreader in an electronic device.

Thus, it is an object of the present invention to provide a graphene oxide (GO) gel-derived unitary graphene layer (monolithic graphene film) and its composite version (containing a carbon/graphite filler phase dispersed in or bonded by a unitary graphene matrix derived from a GO gel), which exhibit a thermal conductivity comparable to or greater than that of the PG, HOPG, or CVD graphene film.

It is a specific object of the present invention to provide a new class or classes of materials (i.e., a GO gel-derived unitary graphene monolithic and its composite materials) that have the following characteristics (separately or in combination) that distinguish themselves from PG, HOPG, CVD graphene film, flexible graphite sheets, flexible graphite composites, conventional resin matrix composites and carbon matrix composites:

(1) This unitary graphene material, standing alone or as the matrix material in a composite, is an integrated graphene entity that is either a graphene single crystal (single grain only) or a poly-crystal (multiple grains but typically having incomplete grain boundaries). Typically and preferably, with some compression or shearing stresses exerted on the GO and a subsequent heat treatment, the unitary graphene composite has all the graphene planes in all the grains being essentially oriented parallel to one another (i.e., the crystallographic c-axis of all grains pointing in an identical direction).

(2) The unitary graphene matrix is an integrated graphene entity that is not an aggregate or stack of multiple discrete graphite flakes or discrete platelets of graphene or GO, and does not contain any discernible or discrete flake/platelet derived from the original GO gel.

(3) This integrated graphene matrix is not made by gluing or bonding discrete flakes/platelets together with a binder, linker, or adhesive. Instead, GO molecules in the GO gel are chemically merged, mainly in an edge-to-edge manner (forming 2-D giant graphene molecules) but possibly also with adjacent GO molecules below or above (forming 3-D network of graphene chains). Through joining or forming of covalent bonds with one another, the GO molecules are adhered into an integrated graphene entity (the unitary graphene matrix), without using any externally added linker or binder molecules or polymers. In the presence of carbon or graphite filler particles (e.g. carbon black particles or CNTs), the GO molecules are also capable of acting as a binder or adhesive that chemically bonds these carbon/graphite filler particles together to form a strong composite.

(4) This unitary or monolithic graphene matrix (a single crystal or poly-crystal with essentially all graphene planes having an identical crystallographic c-axis) is derived from a GO gel, which is in turn obtained from heavy oxidation of natural graphite or artificial graphite particles originally having multiple graphite crystallites. Prior to being chemically oxidized to become GO gel, these starting or original graphite crystallites have an initial length ($L_a$ in the crystallographic a-axis direction), initial width ($L_b$ in the b-axis direction), and thickness ($L_c$ in the c-axis direction). The resulting unitary graphene entity typically has a length or width significantly greater than the $L_a$ and $L_b$ of the original graphite crystallites.

(5) It may be noted that there has been numerous reports on "graphene composites." However, these "graphene composites" make use of discrete pristine graphene sheets, graphene oxide platelets, or reduced graphene oxide platelets as the reinforcement phase which is dispersed in a matrix material selected from a resin (to form a resin matrix composite), a metal (metal matrix composite), a carbon (carbon matrix composite), a glass (glass matrix composite), or a ceramic (ceramic matrix composite). In these prior art "graphene composites," graphene sheets/platelets are the discrete and dispersed phase, not the matrix phase (or continuous phase); these discrete graphene sheets/platelets are bonded and protected by a matrix material, such as a resin, metal, carbon (CVD carbon, amorphous carbon, or polymeric carbon), glass, or ceramic. In stark contrast or completely oppositely, in the presently invented unitary graphene matrix composite, graphene is the matrix material that serves to bond, adhere, and protect the dispersed filler phase, such as CNT and carbon black (CB) particles. CNT or CB particles are dispersed in and protected by the unitary graphene matrix. Typically, the graphene matrix is a continuous, unified, or integrated material phase.

The present invention also provides a method or process for producing such a GO gel-derived unitary graphene entity (or a graphene single crystal, including a graphene poly-crystal with an incomplete grain boundary) and the graphene matrix composite. This unitary graphene entity can be used as a standalone layer (e.g., as a heat spreader) or as a matrix material for a composite containing a carbon or graphite filler phase.

Another object of the present invention is to provide a cost-effective process of producing a GO-derived graphene monolith and a graphene matrix composite that exhibit a combination of exceptional thermal conductivity, electrical conductivity, mechanical strength, surface hardness, and scratch resistance unmatched by any thin-film graphitic material of comparable thickness range.

In particular, the present invention provides a process for producing a unitary or monolithic graphene layer or graphene single crystal (as a standalone material or as a matrix material) from a GO gel. This process does not involve or require an ultrahigh temperature as is absolutely required of the processes for producing pyrolytic graphite (including HOPG) from either carbonized polymers (e.g. polyimide) or using the CVD deposition. The presently invented process is simpler (hence, more reliable), less energy-intensive, and highly scalable.

This thermally and electrically conductive graphene monolith or graphene matrix composite can be used for thermal management applications (e.g. for use as a heat spreader) in a microelectronic device, such as a mobile phone (including a smart phone), a notebook computer, a tablet, an e-book, a telecommunication device, and any hand-held computing device or portable microelectronic device.

It is another object of the present invention to provide a GO-derived unitary graphene entity and graphene matrix composite that exhibit a combination of exceptional thermal conductivity, electrical conductivity, mechanical strength, surface smoothness, surface hardness, and scratch resistance unmatched by any thin-film material of comparable thickness range.

It is a specific object of the present invention to provide a highly conductive graphene matrix composite that meets the following technical requirements (a) in-plane thermal conductivity greater than 600 W/mK (preferably greater than 1,000 W/mK, and further preferably greater than 1,700 W/mK); (b) in-plane electrical conductivity greater than 2,000 S/cm (preferably >3,000 S/cm, more preferably >5,000 S/cm, and most desirably >10,000 S/cm); (c) Rockwell surface hardness value >60 (preferably >80); and/or (d) a tensile strength greater than 80 MPa (preferably >100 MPa, more preferably >150 MPa, and most preferably >200 MPa).

SUMMARY OF THE INVENTION

The present invention provides a unitary graphene matrix composite comprising: (a) A unitary graphene matrix containing closely packed and chemically bonded graphene planes having an inter-graphene plane spacing of 0.335 to 0.40 nm and an oxygen content of 0.001% to 10% by weight, which unitary graphene matrix is obtained from heat-treating a graphene oxide gel at a temperature higher than 100° C. and contains no discrete graphene platelets derived from the graphene oxide gel; and (b) A carbon or graphite filler phase selected from a carbon or graphite fiber, carbon or graphite nano-fiber, carbon nano-tube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof. The carbon or graphite filler phase occupies a weight fraction of 0.01% to 99% based on the total composite weight and the carbon or graphite filler phase is in a particulate, filamentary, or rod-like form dispersed in the unitary graphene matrix.

Preferably, the carbon or graphite filler phase occupies a weight fraction from 0.1% to 70% based on the total composite weight. The graphene matrix composite preferably has a physical density of at least 1.5 g/cm$^3$ or a porosity level lower than 20%, and more preferably has a physical density of at least 1.7 g/cm$^3$ or a porosity level lower than 10%. Preferably and typically, the carbon or graphite filler is chemically bonded by the unitary graphene matrix. It is most surprising that this unitary graphene matrix, prepared through the route of a GO gel, is capable of chemically bonding to a filler phase and that the constituent GO molecules in a GO gel mass are capable of chemically bonding and merging with one another to form an integrated 2-D or 3-D network of aromatic chains or giant graphene molecules of essentially infinite molecular weight, much like a 3-D network of cross-linked polymer chains. Chemical analyses, including various spectroscopy studies, have demonstrated that these chemically bonded graphene molecules contain a combination of sp$^2$ and sp$^3$ electronic configurations.

It may be noted that the unitary graphene matrix material, when prepared alone without the presence of the carbon or graphite filler phase, can be made into a unitary graphene layer or graphene single crystal. This unitary graphene layer or graphene single crystal would contain closely packed and bonded parallel graphene planes having an inter-graphene plane spacing of 0.335 to 0.40 nm and an oxygen content of 0.01% to 10% by weight. This unitary graphene layer or graphene single crystal can be obtained from heat-treating a graphene oxide gel at a temperature higher than 100° C., wherein an average mis-orientation angle between two graphene planes is less than 10 degrees, preferably and typically less than 5 degrees. The graphene single crystal, prepared alone without the presence of a filler, refers to the single-grain or single-domain graphene or poly-crystalline structure (but having an incomplete grain boundary) in which most of the graphene planes in all grain(s) are essentially parallel to one another. In this unitary graphene or graphene monolith, there contains no discrete graphite flake or graphene platelet derived from the graphene oxide gel.

In the unitary graphene matrix composite prepared in the presence of a filler phase, the chemically bonded graphene planes also can be parallel to one another. In the unitary graphene matrix composite, the unitary graphene matrix typically contains no complete grain boundary therein and contains no discrete or discernible graphene platelet derived from the original graphene oxide gel. Preferably and typically, the carbon or graphite filler is chemically bonded by the unitary matrix material in the composite (e.g. via covalent bonds).

The process typically begins with preparation of a mass of GO gel, which is then mixed with particles of the carbon/graphite filler phase to form a slurry mass. The slurry is formed into a desired shape, preferably in a layer form preferably with a shear stress to facilitate orientation or alignment of aromatic GO molecules. The layer is preferably less than 10 mm in thickness, more preferably less than 1 mm, and most preferably less than 500 µm in thickness prior to drying. Alternatively, the carbon/graphite filler phase is first formed into a porous shape (e.g. mat, paper, or fabric), which is then impregnated with the GO gel. In either route, the liquid component of this GO gel is then partially or totally removed and, concurrently or sequentially, this GO material is subjected to a heat treatment. This heat treatment, also herein referred to as a re-graphitization treatment, thermally converts the GO molecules to an integrated graphene film by chemically merging individual graphene oxide molecules primarily sideway in an edge-to-edge manner to form significantly larger graphene planes, but sometimes also chemically linking with the GO molecules below or above this graphene plane to form a 3-D molecular network.

In the unitary graphene matrix composite, the carbon or graphite filler is preferably in a form of porous woven fabric, porous non-woven fabric, porous mat, or porous paper, and the composite is made by impregnating the porous woven fabric, porous non-woven fabric, porous mat, or porous paper with the graphene oxide gel prior to heat treating the graphene oxide.

Alternatively, the carbon or graphite filler may be made into a form of fiber yarns or fiber bundles impregnated with the graphene oxide gel and the composite is made by forming the fiber yarns or bundles into a desired shape prior to heat treating. The desired shape can mean a unidirectional, bi-directional, multi-directional, angle-plied, woven, or filament-wound shape. In other words, the fiber yarns or bundles (prior, during, or after graphene oxide gel impregnation) may be formed into a unidirectional fiber composite shape, like the shape of a conventional unidirectional continuous carbon fiber-reinforced epoxy composite with the epoxy resin being replaced by the graphene oxide gel. It is highly surprising for us to observe that graphene oxide gel has an outstanding adhesive power that can bond the filler phase (e.g. carbon fibers or nano-tubes) together to form a composite of exceptional structural integrity.

The graphene oxide gel-derived unitary or monolithic graphene layer or the corresponding graphene matrix composite has a unique combination of outstanding thermal conductivity, electrical conductivity, mechanical strength, scratch resistance, and elimination of the possibility of having surface graphite flakes or particles to "flake off" (actually, there is no discrete flake/platelet to be peeled therefrom).

The graphene oxide (GO) gel-derived unitary graphene matrix material or graphene matrix composite has the following characteristics (separately or in combination):

(1) The unitary graphene matrix material itself (with or without the presence of a filler phase) is an integrated graphene object that is either a graphene single crystal or a poly-crystal having multiple grains (but with incomplete or poorly delineated grain boundaries). When made into a thin-film form (e.g. <200 µm thick), the unitary graphene matrix is composed of multiple graphene planes most of which are essentially oriented parallel to one another. Specifically, the crystallographic c-axis directions of most of the graphene planes in all the grains are essentially pointing to an identical direction. This observation appears to hold true when the carbon/graphite filler phase is from 0% to 50% by weight, relatively independent of the type of carbon/graphite filler used.

(2) In contrast to the paper-like sheets of expanded graphite flakes or graphene platelets (e.g. those prepared by a paper-making process), this integrated graphene entity (the unitary graphene matrix material) is not an aggregate or stack of multiple discrete graphite flakes or discrete platelets of graphene, GO, or RGO. This is a single graphene entity or monolith, not a simple aggregate of multiple graphite flakes (such as FG foil) or graphene sheets (such as graphene paper or graphene membrane). This unitary graphene entity does not contain discrete graphite flakes or discrete graphene platelets dispersed therein. The GO molecules do not revert back to individual or discrete graphene platelets or graphite flakes.

(3) In other words, this unitary graphene matrix material is not the result of simply exfoliating the graphene sheets or graphite flakes (that constitute the original structure of graphite particles) and then re-orienting these discrete sheets/flakes along one direction. Such a simple aggregating procedure would lead to a simple collection or stack of discrete flakes/sheets/platelets that can be detected or discerned with an un-assisted eye or under a low-magnification optical microscope (×100-×1000).

Contrarily, the original graphite particles are heavily oxidized, to the extent that practically every one of the original graphene planes has been oxidized and isolated from one another to become individual molecules that possess highly reactive functional groups at the edge and, mostly, on graphene planes as well. These individual hydrocarbon molecules (containing elements such as O and H, not just carbon atoms) are dissolved in the reaction medium (e.g. mixture of water and acids) to form a gel-like mass, herein referred to as GO gel. This gel is then cast onto a smooth substrate surface, with the liquid components removed to form a dried GO layer. When properly dispersed and heated on a solid substrate surface, these highly reactive molecules react and join with one another mostly in lateral directions along graphene planes (in an edge-to-edge manner) and, in some cases, between graphene planes as well. These linking and merging reactions proceed in such a manner that the molecules are chemically merged, linked, and integrated into one single entity or monolith (not just physically stacked or packed together). The molecules completely lose their own original identity and they no longer are discrete sheets/platelets/flakes. There is only one grain (or few grains with incomplete grain boundaries) that is essentially one huge molecule or just a few giant molecules with an essentially infinite molecular weight. This may also be described as a graphene single crystal (with only one grain in the entire structure or entity, or a poly-crystal having several grains, but typically no discernible, well-defined grain boundaries, e.g. FIG. 3(f)). All the constituent graphene planes are very large in lateral dimensions (length and width) and are essentially parallel to one another.

In-depth X-ray diffraction, atomic force microscopy, and electron microscopy (including selected area diffraction) studies indicate that the graphene monolith is composed of several huge graphene planes (with length/width typically >>100 μm, more typically >>1 mm, and most typically >>1 cm). These giant graphene planes are stacked and bonded along the thickness direction (crystallographic c-axis direction) through not just the van der Waals forces in conventional graphite crystallites, but also covalent bonds, Not to be limited by theory, but the studies based on combined Raman, FTIR, and electron spectroscopy for chemical analysis (ESCA) appear to indicate the co-existence of $sp^2$ (dominating) and $sp^3$ (weak but existing) electronic configurations, not just the conventional $sp^2$ alone in graphite.

(4) This integrated graphene entity is not made by gluing or bonding discrete flakes/platelets together with a binder, linker, or adhesive. Instead, GO molecules in the GO gel are merged, mainly edge-to-edge through joining or forming of covalent bonds with one another, into an integrated graphene entity, without using any externally added linker or binder molecules or polymers.

(5) This unitary or monolithic graphene entity is a single crystal or poly-crystal (having poorly defined or incomplete grain boundaries) with the crystallographic c-axis in all grains being essentially parallel to each other. This entity is derived from a GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). The resulting unitary graphene entity typically has a length or width significantly greater than the $L_a$ and $L_b$ of the original crystallites. The length/width of this unitary graphene entity or that of a graphene single crystal is typically greater than the $L_a$ and $L_b$ of the original crystallites. Even the individual grains in a poly-crystalline unitary graphene entity have a length or width significantly greater than the $L_a$ and $L_b$ of the original crystallites. They can be as large as the length or width of the unitary graphene entity itself, not just 2 or 3 times higher than the initial $L_a$ and $L_b$ of the original crystallites.

(6) The unitary graphene matrix composite may advantageously contain elongated-shape or filamentary filler particles (e.g. carbon or graphite fibers, carbon or graphite nano-fibers, carbon nano-tubes, carbon nano-rods, and/or needle coke particles) that have a length and a diameter or thickness. The composite may be produced in such a manner that the elongated-shape or filamentary particles are aligned along a length direction so that the composite is anisotropic having an anisotropy ratio greater than 10, wherein the anisotropy ratio is defined as a length-direction property-to-thickness-direction property ratio and the property is electrical conductivity, thermal conductivity, strength, or modulus. The unitary graphene matrix composite can have an anisotropy ratio greater than 100 for some engineering applications (e.g. heat spreader application). For other applications, the anisotropy ratio may be less than 10 or less than 2. An anisotropy ratio of 1 means totally isotropic.

The unitary graphene matrix composite can have a thickness as low as 10 nm, but preferably >100 nm, more preferably >1 μm, even more preferably >10 μm. The unitary graphene matrix material alone or graphene matrix composite preferably has a thickness less than 200 μm for a heat spreader application, but it can be thicker. Further preferably, the material has a thickness greater than 10 μm, but less than 200 μm. The thickness range of 20-100 μm is particularly useful for mobile device thermal management applications.

The unitary graphene matrix composite of the present invention has overcome all the major problems associated with the flexible graphite foil produced by re-compression of exfoliated graphite worms or exfoliated graphite flakes of natural graphite and/or artificial graphite. The flexible graphite sheet or foil prepared by re-compressing (e.g. roll-pressing) exfoliated graphite worms or flakes has a great tendency to flake off, emitting graphite flakes into air and eventually relocating to a dangerous spot (e.g. where the presence of graphite flakes could cause internal short-circuiting). Further, flexible graphite sheets or foils are relatively brittle and weak, and hence are difficult to handle in an actual microelectronic device manufacturing environment. They also do not possess high thermal conductivity (most typically <300 W/mK). These and other major issues associated with the use of flexible graphite sheets in a microelectronic device for a thermal management purpose have been effectively overcome surprisingly by the presently invented unitary graphene body.

The unitary graphene material is derived from a graphene oxide gel, which is produced from particles of natural graphite or artificial graphite composed of multiple graphite crystallites. These crystallites typically have an initial length $L_a$ (in the crystallographic a-axis direction) of less than 100 μm (more typically less than 10 μm), an initial width $L_b$ in the b-axis direction also of more typically less than 10 μm, and a thickness $L_c$ in the c-axis direction (typically 0.2 to 10 μm). However, the presently invented GO-derived unitary graphene layer or graphene single crystal typically has a length or width at least greater than twice (more typically significantly greater than 3 times) the initial $L_a$ or twice (more typically >3 times) the $L_b$ of the graphite crystallites of the starting materials. The unitary graphene layer or graphene single crystal typically has a length or width no less than 10 μm, more typically no less than 100 μm, and even more typically no less than 1 cm. They often are extended to cover the entire width of the original GO gel layer deposited on a substrate surface, which can be >100 cm as desired.

As a preferred processing condition for the unitary graphene material, if the heat-treating temperature for GO is from 100° C. to 1,000° C., the unitary graphene matrix composite has a thermal conductivity greater than 400 W/mK or electrical conductivity greater than 1,000 S/cm. Alternatively, if the heat-treating temperature is from 1,000° C. to 1,500° C., the resulting unitary graphene composite typically has a thermal conductivity greater than 600 W/mK or electrical conductivity greater than 2,000 S/cm. With a heat-treating temperature of from 1500° C. to 2,500° C., the unitary graphene composite typically has a thermal conductivity greater than 1,000 W/mK or electrical conductivity greater than 3,000 S/cm (or even >8,000 S/cm). With a heat-treating temperature of from 2,500° C. to 3,250° C., the unitary graphene layer or graphene single crystal has a thermal conductivity greater than 1,500 W/mK or electrical conductivity greater than 5,000 S/cm (typically greater than 8,000 S/cm and, in many cases, greater than 10,000 S/cm). The above recited thermal conductivity and electrical conductivity values can be significantly higher if the carbon/graphite filler chosen is highly conducting (e.g. >1,750 W/mK and/or >15,000 S/cm).

The unitary graphene layer or graphene single crystal typically has an oxygen content from 0.01% to 5% by weight, more typically from 0.01% to 2% by weight. If the re-graphitization temperature exceeds 2,000° C. and is conducted under very strict protective atmosphere or extremely high vacuum conditions, one can essentially eliminate oxygen.

For the preparation of the unitary graphene layer or graphene single crystal, the graphene oxide gel is composed of graphene oxide molecules dispersed in an acidic medium having a pH value of no higher than 5 and the graphene oxide molecules have an oxygen content no less than 20% by weight while in a gel state.

The GO gel is obtained by immersing a graphitic material in a powder or fibrous form (e.g. natural or artificial graphite powder or graphite fibers) in an oxidizing liquid medium in a reaction vessel at a reaction temperature for a length of time sufficient to obtain a graphene oxide gel composed of graphene oxide molecules dispersed in the liquid medium. The graphene oxide molecules preferably and typically have an oxygen content no less than 20% by weight (typically 20%-46% by weight of oxygen) and a molecular weight less than 43,000 g/mole while in a gel state. Preferably, graphene oxide molecules have a molecular weight less than 4,000 g/mole while in a gel state, more preferably between 200 g/mole and 4,000 g/mole while in a gel state.

The unitary graphene matrix composite is produced by depositing or dispensing a layer of graphene oxide gel-filler mixture onto a surface of a substrate or into a mold cavity. The liquid component is then removed from this mixture layer of graphene oxide gel and the filler phase. This is followed by subjecting this mixture to a heat treatment temperature of at least 100-150° C. for thermal reduction and/or re-graphitization. A good heat treatment temperature is from 500° C. to 1,500° C. for re-graphitization. Although not required, the heat treatment temperature may be higher than 1,500° C. for re-graphitization, or may be in the range of from 1,500° C. to 2,500° C. A temperature higher than 2,500° C. may be used if so desired.

The starting materials for the preparation of graphene oxide gel include a graphitic material selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

The unitary graphene matrix composite shows a surprisingly high Rockwell hardness value, typically greater than 80 and often greater than 100. This is unprecedented since prior art flexible graphite foil, pyrolytic graphite, or bulk graphite does not show such a high hardness.

The unitary graphene matrix composite of the present invention can exhibit an electrical conductivity greater than 1,500 S/cm, a thermal conductivity greater than 600 W/mK, a physical density greater than 1.8 g/cm3, and/or a tensile strength greater than 80 MPa. With a higher re-graphitization temperature, the graphene monolithic can have an electrical conductivity greater than 3,000 S/cm, a thermal conductivity greater than 1,000 W/mK, a physical density greater than 1.9 g/cm3, and/or a tensile strength greater than 100 MPa. It can even exhibit an electrical conductivity greater than 5,000 S/cm, a thermal conductivity greater than 1,500 W/mK, a physical density greater than 2.0 g/cm$^3$, and/or a tensile strength greater than 150 MPa.

Typically, the graphene oxide gel is prepared by immersing a graphitic material in an oxidizing agent to form an initially optically opaque suspension and allowing an oxidizing reaction to proceed until an optically transparent or translucent solution is formed. The starting graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. The graphene oxide gel is composed of graphene oxide molecules dispersed in an acidic medium having a pH value of no higher than 5 and the graphene oxide molecules have an oxygen content no less than 20% by weight (typically from 20% to approximately 46% by weight.

This graphene oxide gel has the characteristics that it is optically transparent or translucent and visually homogeneous with no discernible discrete graphene or graphene oxide sheets dispersed therein. In contrast, conventional suspension of discrete graphene or graphene oxide sheets, or graphite flakes looks opaque, dark, black or heavy brown in color with individual graphene sheets, graphene oxide sheets, or graphite flakes being discernible or recognizable with naked eyes. The graphene oxide molecules dissolved in the liquid medium of a graphene oxide gel are aromatic chains that have an average number of benzene rings in the chain typically less than 1000, more typically less than 500, and most typically less than 100. Most of the molecules have more than 5 or 6 benzene rings (mostly >10 benzene rings) from combined atomic force microscopy, high-resolution TEM, and molecular weight measurements. These benzene-ring type of aromatic molecules have been heavily oxidized and contain functional groups, such as —COOH and —OH and, therefore, are "soluble" (not just dispersible) in polar solvents, such as water.

These soluble molecules behave like resins and are surprisingly capable of forming a coherent layer of graphene oxide of good structural integrity and high thermal conductivity. By contrast, conventional discrete graphene or graphene oxide sheets and graphite flakes do not have any self-adhesion or cohesion power. These sheets or flakes would just form a loosely packed mass of un-bonded particles that does not have any structural integrity.

The present invention also provides a unitary graphene matrix composite-based heat spreader or heat sink product for use in a hand-held device, such as a power tool, a microelectronic or telecommunication device (e.g. mobile phone, tablet, laptop computer, LCD display, etc), a light-emitting diode (LED) lighting device or system. The light weight (lower density compared to metal and ceramic materials), exceptional thermal conductivity, relatively high structural integrity, superior surface hardness and scratch resistance, and eliminated or significantly reduced tendency to emit free graphite or carbon particles into air make the invented graphene oxide-coated graphitic layer an ideal thermal management material.

DESCRIPTION OF THE PREFERRED EMBODIMENTS

Figure 1A:
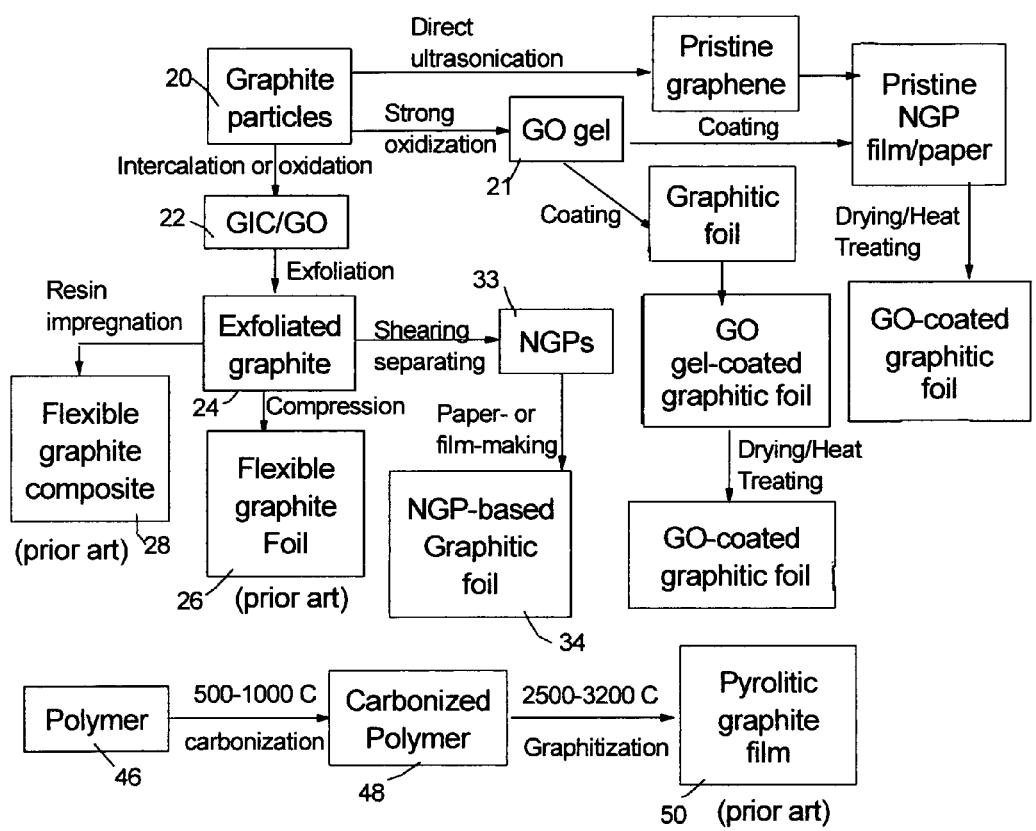
FIG. 1 (a) A flow chart illustrating various prior art processes of producing exfoliated graphite products (flexible graphite foils and flexible graphite composites) and pyrolytic graphite (bottom portion), along with processes for producing graphene oxide gel and GO gel-coated laminates; (b) Schematic drawing illustrating the processes for producing graphite or graphene oxide paper, mat, film, and membrane of simply aggregated flakes/platelets. All processes begin with intercalation and/or oxidation treatment of graphitic materials (e.g. natural graphite particles).

The present invention provides a unitary graphene matrix composite comprising: (a) a unitary graphene matrix containing closely packed and chemically bonded graphene planes having an inter-graphene plane spacing of 0.335 to 0.40 nm and an oxygen content of 0.001% to 10% by weight, which unitary graphene matrix is obtained from heat-treating a graphene oxide gel at a temperature higher than 100° C. and contains no discrete graphene platelets derived from the graphene oxide gel; and (b) A carbon or graphite filler phase selected from a carbon or graphite fiber, carbon or graphite nano-fiber, carbon nano-tube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof. The carbon or graphite filler phase occupies a weight fraction of 0.01% to 99% based on the total composite weight and the carbon or graphite filler phase is preferably in a particulate, filamentary, or rod-like form dispersed in the unitary graphene matrix. These discrete particles, filaments, and cylindrical shape fillers are the dispersed phase (reinforcement or filler phase) and the GO-derived unitary graphene material is the continuous phase (matrix).

Preferably and typically, most of the chemically bonded graphene planes in the unitary graphene matrix are parallel to one another. The unitary graphene matrix is often a graphene single crystal or a graphene poly-crystal that contains no complete grain boundary therein. Typically, the carbon or graphite filler is chemically bonded by the unitary graphene matrix material. This chemical bonding is more pronounced if the carbon/graphite filler is chemically treated (e.g. using a mixture of sulfuric acid and nitric acid) prior to being mixed with the GO gel.

The heat treatment temperature conditions are such that the unitary graphene matrix composite is relatively pore-free having a physical density of at least 1.5 g/cm$^3$ or a porosity level lower than 20%. Under more typical processing conditions, the unitary graphene matrix composite has a physical density of at least 1.7 g/cm$^3$ or a porosity level lower than 10%. In most cases, the unitary graphene matrix composite has a physical density greater than 1.8 g/cm$^3$ or a porosity level less than 5%. The chemically bonded graphene planes in the unitary graphene composite typically contain a combination of sp$^2$ and sp$^3$ electronic configurations.

In a preferred embodiment of the present invention, the process for producing the unitary graphene matrix composite comprises: (a) preparing a graphene oxide gel having graphene oxide molecules dispersed in a fluid medium, wherein the graphene oxide gel is optically transparent or translucent; (b) mixing the carbon or graphite filler phase in the graphene oxide gel to form a slurry; (c) dispensing the slurry onto a surface of a supporting substrate or a cavity of a molding tool; (d) partially or completely removing the fluid medium from the slurry to form a composite precursor; and (e) heat-treating the composite precursor to form the unitary graphene composite at a temperature higher than 100° C. (preferably >500° C. and more preferably from 500° C. to 1500° C.). Although not required, higher temperatures may be used if so desired.

In this process, steps (c) and (d) preferably include feeding a sheet of a solid substrate material from a roller to a deposition zone, dispensing the slurry or suspension onto a surface of the sheet of solid substrate material to form a slurry layer thereon, drying the slurry or suspension to form a dried composite precursor layer deposited on the substrate surface, and collecting composite precursor-deposited substrate sheet on a collector roller. The process may further comprise a step of compressing the composite precursor prior to being collected on the collector roller. This makes a roll-to-roll process amenable to mass production of graphene matrix composites.

Alternatively, the process may comprise: (a) preparing a graphene oxide gel having graphene oxide molecules dispersed in a fluid medium, wherein the graphene oxide gel is optically transparent or translucent; (b) forming the carbon or graphite filler phase into a desired porous shape having pores therein, and impregnating the graphene oxide gel into these pores of the desired porous shape to form an impregnated shape; (c) partially or completely removing the fluid medium from the impregnated shape to form a composite precursor; and (d) heat-treating the composite precursor to form the unitary graphene composite at a temperature higher than 100° C. Again, the re-graphitization temperature is preferably >500° C. and more preferably from 500° C. to 1500° C. Although not required, higher heat treatment temperatures may be used if so desired. The desired porous shape may be a porous woven fabric, porous non-woven fabric, porous mat, or porous paper.

In yet another preferred embodiment, the process for producing the unitary graphene matrix composite comprises: (a) preparing a graphene oxide gel having graphene oxide molecules dispersed in a fluid medium, wherein the graphene oxide gel is optically transparent or translucent; (b) combining the carbon or graphite filler phase and the graphene oxide gel to form a graphene oxide gel-impregnated shape of fiber yarns or bundles; (c) partially or completely removing the fluid medium from graphene oxide gel-impregnated shape to form a composite precursor; and (d) heat-treating the composite precursor to form the unitary graphene composite at a temperature higher than 100° C. The graphene oxide gel-impregnated shape may be selected from a unidirectional, bi-directional, multi-directional, angle-plied, woven, or filament-wound shape. In other words, the processes for producing conventional resin matrix composites, such as filament winding, pultrusion, yarn weaving, and pre-impregnating, may be adapted to fabricate the graphene matrix composite.

This is quite surprising for several reasons: (1) The GO gel and conventional polymer melts or polymer-solvent solutions appear to exhibit very different and distinct rheological behaviors; (2) It is well-known in the field of polymer science that highly aromatic chains are typically not soluble, meltable, or flowable to enable solution or melt processing and GO molecules are highly aromatic; (3) Much to the surprise of polymer scientists, heavy oxidation can chemically convert discrete solid graphite flakes to soluble GO molecules and these highly aromatic molecules can be chemically linked together to form huge 2D giant molecules or 3D network of "cross-linked" graphene chains that provide cohesiveness and adhesiveness required of a resin matrix composite having a good resin-filler interfacial bonding.

The graphene oxide gel may be prepared by immersing a graphitic material in a powder or fibrous form in an oxidizing liquid to form an initially optically opaque suspension in a reaction vessel at a reaction temperature for a length of time sufficient to obtain a graphene oxide gel that is optically transparent or translucent. The graphene oxide gel is composed of graphene oxide molecules dispersed in an acidic medium having a typical pH value of no higher than 5 and the graphene oxide molecules have an oxygen content typically no less than 20% by weight when the system is in a gel state.

Specifically, a graphitic material may be immersed in an oxidizing agent to form an optically opaque suspension. It is initially opaque because the starting graphitic material is in a carbon or graphite particulate form having a particle size or chemical nature that scatters visible wavelength or absorbs light. Useful starting materials include natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. As the oxidizing reaction proceeds to a critical extent, an optically transparent or translucent solution is formed.

All the aforementioned processes may further comprise a step of compressing the composite precursor prior to or during heat treating. Preferably, the processing conditions involve a shear stress field that promotes alignment of GO molecules.

The graphene oxide (GO) gel-derived unitary graphene material and the unitary graphene matrix composite have the following characteristics (separately or in combination):

(1) The unitary graphene matrix material, alone or with a filler phase, is an integrated graphene phase that is either a graphene single crystal or a poly-crystal having multiple grains with incomplete grain boundaries. When made into a thin film (e.g. <200 μm) under a desired shearing stress field condition, both the unitary graphene matrix alone or the corresponding graphene matrix composite have wide/long chemically bonded graphene planes that are essentially oriented parallel to one another. In other words, the crystallographic c-axis directions of all grains and all their constituent graphene planes are essentially pointing in the same direction. It may be noted that the grains in a graphene poly-crystal have very poorly delineated or incomplete grain boundaries. These grains are essentially a single grain with some residual demarcation lines (e.g., FIG. 3(f)). Such type of graphene poly-crystal is best described as a graphene single crystal with some aligned but sporadic defects. This conclusion was drawn after an extensive investigation using a combination of SEM, TEM, selected area diffraction (with a TEM), X-ray diffraction, atomic force microscopy (AFM), Raman spectroscopy, and FTIR.

(2) The paper-like sheets of exfoliated graphite worms (i.e., flexible graphite foils), mats of expanded graphite flakes (100 nm in thickness), and paper or membrane of graphene or GO platelets are a simple, un-bonded aggregate/stack of multiple discrete graphite flakes or discrete platelets of graphene, GO, or RGO. In contrast, the unitary graphene matrix of the present invention is a fully integrated, single graphene entity or monolith containing no discrete flakes or platelets derived from the GO gel.

(3) In prior art processes, discrete graphene sheets (<<100 nm) or expanded graphite flakes (>100 nm) that constitute the original structure of graphite particles could be obtained via expanding, exfoliating, and separating treatments. By simply mixing and re-compressing these discrete sheets/flakes into a thin film, one could attempt to orient these sheets/flakes hopefully along one direction. However, with these conventional processes, the constituent flakes or sheets of the resulting film (aggregate, paper, membrane, or mat) would remain as discrete flakes/sheets/platelets that can be easily discerned or clearly observed even with an un-assisted eye or under a low-magnification optical microscope (×100-×1000).

In contrast, the preparation of the presently invented unitary graphene structure involves heavily oxidizing the original graphite particles, to the extent that practically every one of the original graphene planes has been oxidized and isolated from one another to become individual molecules that possess highly reactive functional groups (e.g. —OH and —COOH) at the edge and, mostly, on graphene planes as well. These individual hydrocarbon molecules (containing elements such as O and H, in addition to carbon atoms) are dissolved in the reaction medium (e.g. mixture of water and acids) to form a gel-like mass, herein referred to as the GO gel. This gel is then cast onto a smooth substrate surface or injected into a mold cavity, typically under shear stress field conditions, and the liquid components are then removed to form a dried GO layer. When heated, these highly reactive molecules react and chemically join with one another mostly in lateral directions along graphene planes (in an edge-to-edge manner) and, in some cases, between graphene planes as well.

Figure 3A:
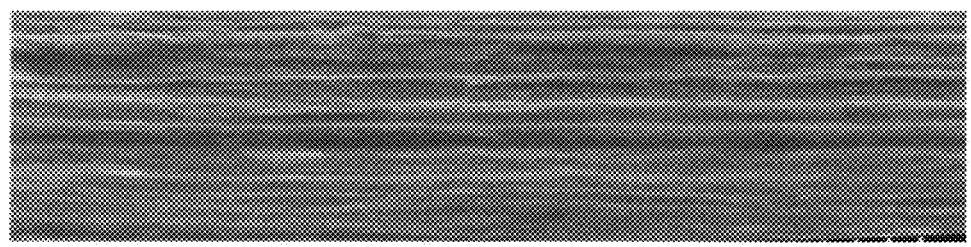
FIG. 3 (a) A SEM image of a GO-derived graphene monolithic wherein multiple graphene sheets, originally 30 nm-2 μm in lateral dimension, have been oxidized, exfoliated, re-oriented, and seamlessly merged into continuous-length graphene sheets or layers that can run for hundreds of centimeters wide or long (only a 120 μm or 0.12 mm width of a 25-cm wide unitary graphene layer being shown in this SEM image); (b) A SEM image of a cross-section of a graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections; (c) Schematic drawing and an attendant SEM image to illustrate the formation process of a unitary graphene entity or graphene single crystal that is composed of multiple graphene planes that are parallel to one another and are chemically bonded in the thickness-direction or crystallographic c-axis direction; (d) Schematic of the prior art graphene poly-crystal obtained by CVD of hydrocarbon on a catalytic surface (e.g. Cu or Ni); (e) Schematic of a graphene single crystal of the present invention; (f) Schematic of another graphene single crystal of the present invention (a "poly-crystal" with incomplete grain boundaries); (g) One plausible chemical linking mechanism (only 2 GO molecules are shown as an example; a large number of GO molecules can be chemically linked together to form a unitary graphene layer).
Figure 3B:
Figure 3C:
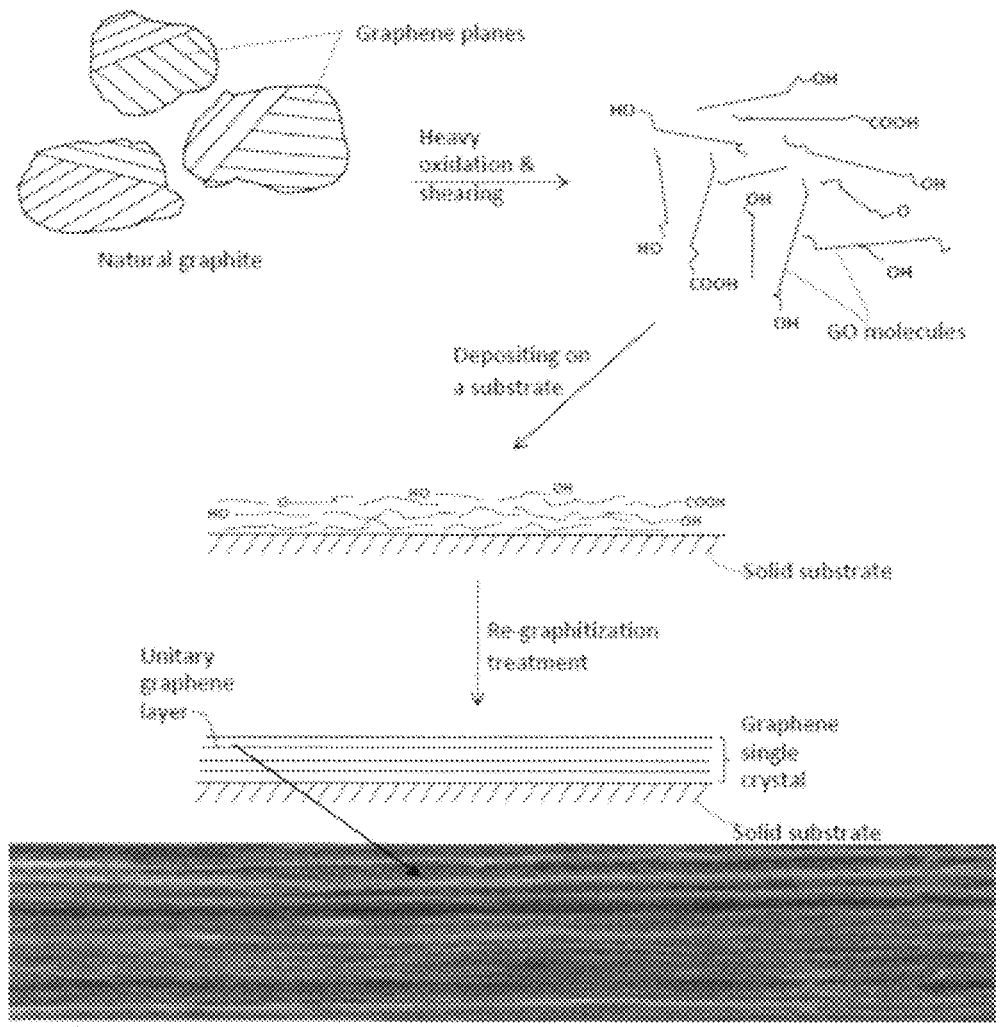
Figure 3D:
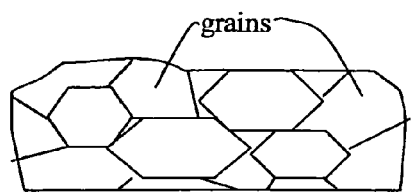
Figure 3E:
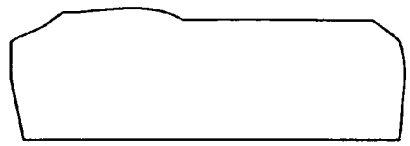
Figure 3F:
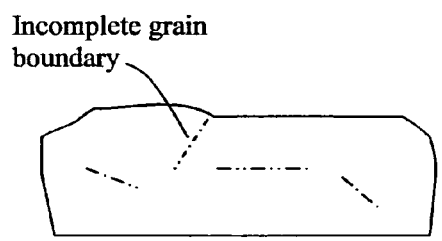
Figure 3G:
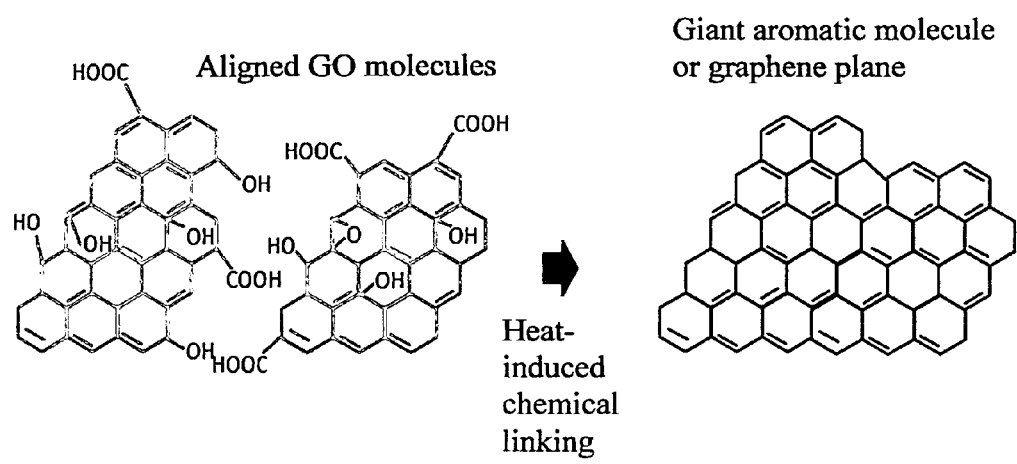

Illustrated in FIG. 3(g) is a plausible chemical linking mechanism where only 2 aligned GO molecules are shown as an example, although a large number of GO molecules can be chemically linked together to form a unitary graphene layer. Further, chemical linking could also occur face-to-face, not just edge-to-edge. These linking and merging reactions proceed in such a manner that the molecules are chemically merged, linked, and integrated into one single entity or monolith. The molecules completely lose their own original identity and they no longer are discrete sheets/platelets/flakes. There is only one single layer-like structure (unitary graphene entity) that is one huge molecule or just a network of interconnected giant molecules with an essentially infinite molecular weight. This may also be described as a graphene single crystal (with only one grain in the entire structure or entity, or a poly-crystal (with several grains, but typically no discernible, well-defined grain boundaries). All the constituent graphene planes are very large in lateral dimensions (length and width) and, if produced under shear stress conditions (particularly into thin films, <200 μm in thickness) and heat-treated at a higher temperature (e.g. >700° C. or much higher), these graphene planes are essentially parallel to one another.

In-depth studies using a combination of SEM, TEM, selected area diffraction, X-ray diffraction, AFM, Raman spectroscopy, and FTIR indicate that the graphene monolith is composed of several huge graphene planes (with length/width typically >>100 μm, more typically >>1 mm, and most typically >>1 cm). These giant graphene planes are stacked and bonded along the thickness direction (crystallographic c-axis direction) often through not just the van der Waals forces (as in conventional graphite crystallites), but also covalent bonds, Not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(4) This integrated graphene entity is not made by gluing or bonding discrete flakes/platelets together with a resin binder, linker, or adhesive. Instead, GO molecules in the GO gel are merged through joining or forming of covalent bonds with one another, into an integrated graphene entity, without using any externally added linker or binder molecules or polymers.

(5) This unitary or monolithic graphene entity is a single crystal (e.g. FIG. 3(e)) or poly-crystal (having incomplete grain boundaries, FIG. 3(f)), typically with the crystallographic c-axis in all grains being essentially parallel to each other. This entity is derived from a GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon heavy oxidation, these initially discrete graphite particles are chemically transformed into highly aromatic graphene oxide molecules having a significant concentration of edge- or surface-borne functional groups (e.g. —OH, —COOH, etc.). These aromatic GO molecules in the GO gel have lost their original identity of being part of a graphite particle or flake. Upon removal of the liquid component from the GO gel, the resulting GO molecules form an essentially amorphous structure. Upon heat treatment (re-graphitization treatment), these GO molecules are chemically merged and linked into a unitary or monolithic graphene entity that is highly ordered (essentially a single crystal).

The resulting unitary graphene entity typically has a length or width significantly greater than the $L_a$ and $L_b$ of the original crystallites. The length/width of this unitary graphene entity or that of a graphene single crystal is typically greater than the $L_a$ and $L_b$ of the original crystallites. Even the individual grains in a poly-crystalline unitary graphene entity have a length or width significantly greater than the $L_a$ and $L_b$ of the original crystallites. They can be as large as the length or width of the unitary graphene entity itself, not just 2 or 3 times higher than the initial $L_a$ and $L_b$ of the original crystallites.

(6) Due to these unique chemical composition (including oxygen content), morphology, crystal structure (including inter-graphene spacing), and structural features (e.g. defects, incomplete or lack of grain boundaries, chemical bonding and no gap between graphene sheets, and no interruptions in graphene planes), the graphene oxide gel-derived unitary or monolithic graphene layer has a unique combination of outstanding thermal conductivity, electrical conductivity, mechanical strength, and scratch resistance (including elimination of the tendency for surface graphite flakes or particles to "flake off" since there is essentially no GO gel-derived discrete flake or platelet in this graphene monolith structure). Even in a unitary graphene matrix composite containing expanded graphite flakes, these flakes are essentially embraced and bonded with an integrated graphene film, allowing no exposed flakes.

Figure 1B:
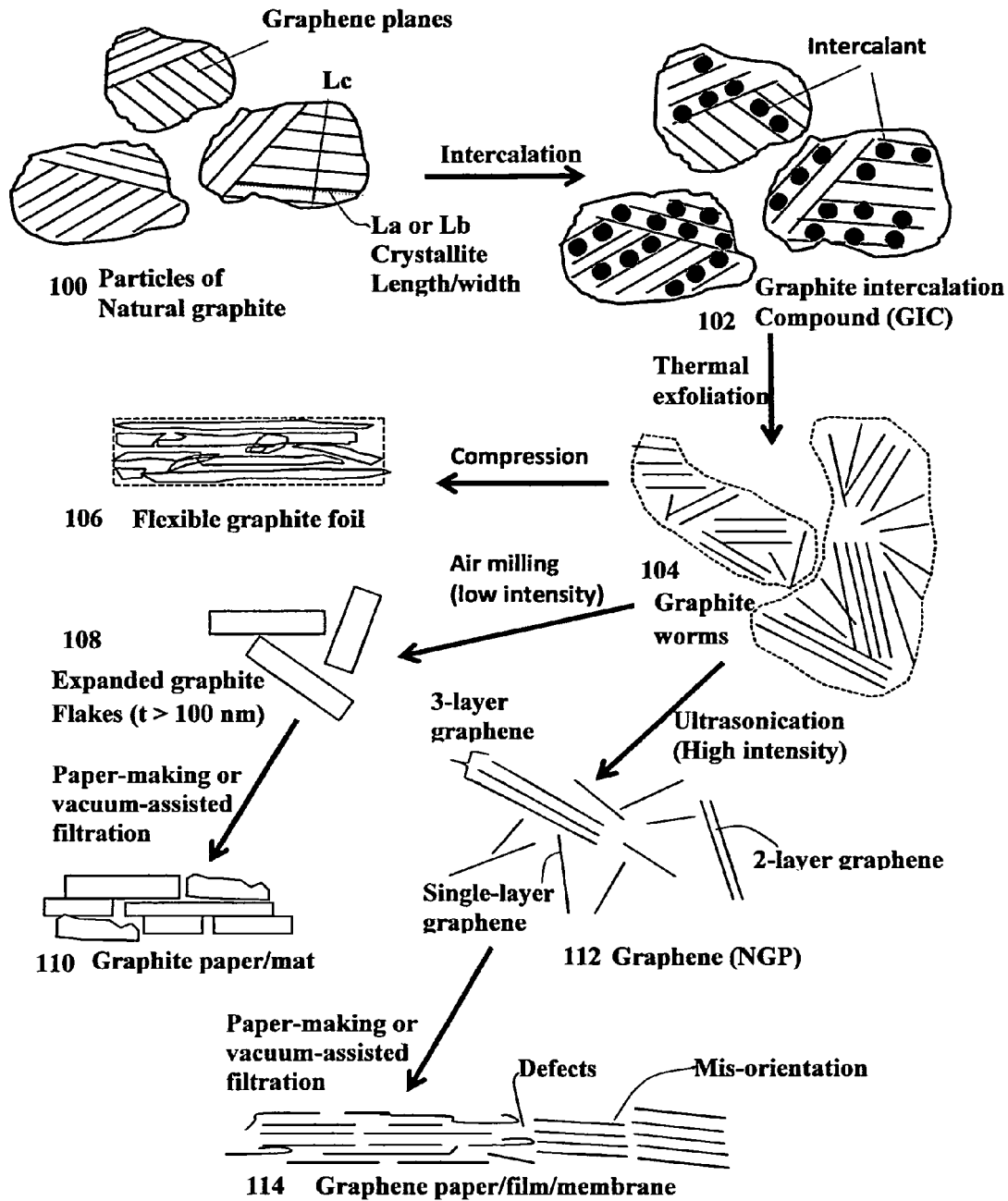

The aforementioned features are further described and explained in details as follows:

As illustrated in FIG. 1(b), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of carbon atoms, commonly referred to as graphene layers or basal planes, are weakly bonded together in their thickness direction (crystallographic c-axis direction) by weak van der Waals forces and groups of these graphene layers are arranged in crystallites.

The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(b), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known and the typical practice is described in U.S. Pat. No. 3,404,061 to Shane et al., the disclosure of which is incorporated herein by reference. In general, flakes of natural graphite (e.g. 100 in FIG. 1(b)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

The upper left portion of FIG. 1(a) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 2(a).

In one prior art process, the exfoliated graphite (or mass of graphite worms) is re-compressed by using a calendering or roll-pressing technique to obtain flexible graphite foils (26 in FIG. 1(a) or 106 in FIG. 1(b)), which are typically much thicker than 100 μm. An SEM image of a cross-section of a flexible graphite foil is presented in FIG. 2(b), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). These properties are inadequate for many thermal management applications and the present invention is made to address these issues.

In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(b)). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1(b) having a thickness >100 nm. These flakes can be formed into graphite paper or mat 110 using a paper- or mat-making process. This expanded graphite paper or mat 110 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including single-layer and/or few-layer graphene sheets, 33 in FIG. 1(a)) may be made into a graphene film/paper (34 in FIG. 1(a) or 114 in FIG. 1(b)) using a film- or paper-making process. FIG. 3(b) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections. NGP aggregates, even when being closely packed, exhibit a thermal conductivity higher than 1,000 W/mK only when the film or paper is cast and strongly pressed into a sheet having a thickness lower than 10 μm, and higher than 1,500 W/mK only when the film or paper is cast and pressed into a sheet having a thickness lower than 1 μm. A heat spreader in many electronic devices is normally required to be thicker than 25 μm and, more desirably, thicker than 50 μm based mainly on handling ease and structural integrity considerations (but no greater than 200 μm due to device volume constraint).

The precursor to the unitary graphene layer is graphene oxide gel. This GO gel is obtained by immersing a graphitic material 20 in a powder or fibrous form in a strong oxidizing liquid in a reaction vessel to form a suspension or slurry, which initially is optically opaque. This optical opacity reflects the fact that, at the outset of the oxidizing reaction, the discrete graphite flakes and, at a later stage, the discrete graphene oxide flakes scatter and/or absorb visible wavelengths, resulting in an opaque and generally dark fluid mass. If the reaction between graphite powder and the oxidizing agent is allowed to proceed at a sufficiently high reaction temperature for a sufficient length of time, this opaque suspension is transformed into a translucent or transparent solution, which is now a homogeneous fluid called "graphene oxide gel" (21 in FIG. 1(a)) that contains no discernible discrete graphite flakes or graphite oxide platelets.

Again, this graphene oxide gel is optically transparent or translucent and visually homogeneous with no discernible discrete flakes/platelets of graphite, graphene, or graphene oxide dispersed therein. In contrast, conventional suspension of discrete graphene sheets, graphene oxide sheets, and expanded graphite flakes in a fluid (e.g. water, organic acid or solvent) look dark, black or heavy brown in color with individual graphene or graphene oxide sheets or expanded graphite flakes discernible or recognizable even with naked eyes or a low-magnification light microscope (100×-1,000×).

The graphene oxide molecules dissolved in the liquid medium of a graphene oxide gel are aromatic chains that have an average number of benzene rings in the chain typically less than 1,000, more typically less than 500, and many less than 100. Most of the molecules have more than 5 or 6 benzene rings (mostly >10 benzene rings) from combined atomic force microscopy, high-resolution TEM, and molecular weight measurements. Based on our elemental analysis, these benzene-ring type of aromatic molecules are heavily oxidized, containing a high concentration of functional groups, such as —COOH and —OH and, therefore, are "soluble" (not just dispersible) in polar solvents, such as water. The estimated molecular weight of these graphene oxide polymers in the gel state is typically between 200 g/mole and 43,000 g/mole, more typically between 400 g/mole and 21,500 g/mole, and most typically between 400 g/mole and 4,000 g/mole.

These soluble molecules behave like polymers and are surprisingly capable of reacting and getting chemically connected with one another (during the subsequent heat treatment or re-graphitization treatment) to form a unitary graphene layer of good structural integrity and high thermal conductivity. Conventional discrete graphene sheets, graphene oxide sheets, or graphite flakes do not have any self-reacting or cohesive bonding capability. Also very surprisingly, during the subsequent heat treatment or re-graphitization treatment, these soluble molecules in the GO gel are capable of chemically bonding a carbon or graphite filler phase (e.g. carbon fibers, expanded graphite flakes, CNTs, carbon black particles, etc.) dispersed in the GO gel.

Again, specifically and most significantly, these graphene oxide molecules present in a GO gel state are capable of chemically merging with one another and getting integrated into extremely long and wide graphene layers (e.g. FIG. 3(a)) when the gel is dried and heat-treated at a sufficiently high temperature for a sufficiently long period of time. These graphene layers can run as wide as the specimen width itself (up to hundreds of centimeters) that are parallel to one another. No individual graphene platelets or sheets are discernible; they have been fully linked and integrated chemically with one another to form a layer-like unitary body in the graphene plane direction and these unitary bodies appear to be chemically bonded with one another along the thickness-direction (or Z-direction). X-ray diffraction studies have confirmed that the d-spacing (inter-graphene plane distance) has been recovered back to approximately 0.335 nm (with <0.02% by weight of oxygen) to 0.40 nm (with approximately 5.0-10% oxygen). There does not appear to be any gap between these graphene layers and, hence, these layers have been essentially merged into one big unitary body, which is a graphene single crystal. FIG. 3(a) depicts an example of such a huge unitary body. Although there appears to be some demarcations between unitary layers, these perceived demarcations are due to slightly different widths between layers. Each layer is composed of one of multiple graphene planes parallel to one another. These seemingly individual unitary layers actually have formed into a single integrated entity or a graphene single crystal. The formation process for such a graphene single crystal is further illustrated in FIG. 3(c).

It may be noted that the presently invented graphene single crystal is fundamentally different and patently distinct from the catalytic CVD graphene thin film in terms of chemical composition, micro-structure, morphology, process of production, all chemical and physical properties, and intended applications. This is explained as follows:

(a) As schematically shown in FIG. 3(d), the prior art graphene poly-crystal obtained by CVD of hydrocarbon on a catalytic surface (e.g. Cu or Ni) is typically composed of many grains with grain size typically smaller than 10 μm (most often <5 μm). These grains also have different orientations with respect to one another.

(b) In contrast, FIG. 3(e) shows a schematic of a graphene single crystal of the present invention having just one single grain or domain. There are no grain boundaries that can impede the movement of electrons or phonons and, hence, this single-grain single crystal has an exceptionally high electrical conductivity and thermal conductivity.

(c) FIG. 3(f) shows a schematic of another graphene single crystal of the present invention, which is a "poly-crystal" with incomplete grain boundaries. The graphene planes in all the grains are oriented parallel to one another.

(d) The presently invented graphene single crystal from GO gel typically has an oxygen content from 0.01% to 5%, but no hydrogen (H). In contrast, the catalytic CVD graphene film has some hydrogen content, but no oxygen.

(e) Typically, the CVD graphene film grown on Cu or Ni surface is single layer or inhomogeneous few-layer graphene with a thickness less than 2 nm (the underlying Cu or Ni foil is not capable of providing catalytic effect when the deposited carbon layer exceeds 2 nm). These ultra-thin layers are thus optically transparent and are intended for touch panel screen applications to replace the ITO glass. In contrast, our graphene monolith is typically thicker than 10 nm (more typically thicker than 1 μm, and most typically thicker than 10 μm) and, hence, typically is optically opaque. The graphene monolith of the present invention has a significantly higher thermal conductivity and can be more easily handled when being implemented into an electronic device (e.g. a mobile phone) as a heat spreader.

The unitary graphene layer can be used alone as a heat spreader in an electronic device. Alternatively, this unitary graphene layer can be a matrix material for a composite containing a carbon or graphite filler (e.g. meso-phase carbon particles, carbon black, acetylene black, needle coke, expanded graphite flake, carbon fiber, CNT, etc). This unitary graphene material is the matrix or dispersing phase, not the filler or dispersed phase, in this unique and novel "graphene matrix composite." This is in sharp contrast to all the prior art graphene composites (or graphene-reinforced composites) wherein discrete graphene platelets are the dispersed phase (reinforcement or filler phase) that is dispersed in or bonded by a matrix phase (e.g. resin, glass, metal, or ceramic matrix). These prior art composites are in fact graphene-reinforced resin matrix, glass matrix, metal matrix, or ceramic matrix composite. They are not the graphene matrix composite of the present invention.

The unitary graphene matrix composite preferably has a thickness no greater than 1 mm, further preferably less than 200 μm, and most preferably less than 100 μm. More preferably, the thickness is greater than 10 μm, further preferably between 10 and 100 μm.

The graphene oxide is obtained from a graphene oxide gel, which gel is composed of graphene oxide molecules dispersed in an acidic medium having a pH value of no higher than 5 and the graphene oxide molecules have an oxygen content no less than 20% by weight (typically between 20 and 46%). In particular, the gel is obtained by immersing a graphitic material in a powder or fibrous form in an oxidizing liquid in a reaction vessel at a reaction temperature for a length of time sufficient to obtain a graphene oxide gel composed of graphene oxide molecules dispersed in an acidic liquid medium having a pH value of no higher than 5 and the graphene oxide molecules have an oxygen content no less than 20% by weight. The subsequent heat treatment process naturally reduces the oxygen content to typically 0.01-10% by weight, more typically 0.01%-5%.

The starting graphitic material to be heavily oxidized for the purpose of forming graphene oxide gel may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. The graphitic material is preferably in a powder or short filament form having a dimension lower than 20 μm, more preferably lower than 10 μm, further preferably smaller than 5 μm, and most preferably smaller than 1 μm.

Using artificial graphite with an average particle size of 9.7 μm as an example, a typical procedure involves dispersing graphite particles in an oxidizer mixture of sulfuric acid, nitric acid, and potassium permanganate (at a weight ratio of 3:1:0.05) at a temperature of typically 0-60° C. for typically at least 3 days, preferably 5 days, and more preferably 7 days or longer. The average molecular weight of the resulting graphene oxide molecules in a gel is approximately 20,000-40,000 g/mole if the treatment time is 3 days, <10,000 g/mole if 5 days, and <4,000 g/mole if longer than 7 days. The required gel formation time is dependent upon the particle size of the original graphitic material, a smaller size requiring a shorter time. It is of fundamental significance to note that if the critical gel formation time is not reached, the suspension of graphite powder and oxidizer (graphite particles dispersed in the oxidizer liquid) appears completely opaque, meaning that discrete graphite particles or flakes remain suspended (but not dissolved) in the liquid medium. As soon as this critical time is exceeded, the whole suspension becomes optically translucent or transparent, meaning that the heavily oxidized graphite completely loses its original graphite identity and the resulting graphene oxide molecules are completely dissolved in the oxidizer liquid, forming a homogeneous solution (no longer just a suspension or slurry).

It must be further noted that if the suspension or slurry, with a treatment time being shorter than the required gel formation time, is rinsed and dried, we would simply recover a graphite oxide powder or graphite intercalation compound (GIC) powder, which can be exfoliated and separated to produce nano graphene platelets (NGPs). Without an adequate amount of a strong oxidizing agent and an adequate duration of oxidation time, the graphite or graphite oxide particles would not be converted into the GO gel state.

The filler or reinforcement phase in the unitary graphene matrix composite may be selected from particles of fine natural graphite, artificial graphite, expanded graphite, meso-phase carbon, meso-phase pitch, meso-carbon micro-bead, soft carbon, hard carbon, coke, carbon fiber, carbon nano-fiber, carbon nano-tube, or a combination thereof.

The graphene oxide-derived unitary graphene matrix composite containing a carbon or graphite filler phase of the present invention typically has a thermal conductivity greater than 800 W/mK, more typically greater than 1,000 W/mK (even when the film thickness is greater than 10 μm) and often greater than 1,700 W/mK. This latter valve is typically obtained when the carbon/graphite filler is exfoliated graphite flakes (>100 nm, but preferably <500 nm) or pristine graphene platelets (<100 nm, preferably <10 nm) and when the final heat treatment temperature is higher than 2,500° C. The graphene matrix composite typically has an electrical conductivity greater than 3,000 S/cm (even >10,000 S/cm). This high electrical conductivity (greater than 3000 S/cm and up to 15,000 S/cm) can be achieved concurrently with a thermal conductivity greater than 1,000 W/mK (up to 1,800 W/mK). Quite often, the unitary graphene matrix composite can exhibit a combination of a high electrical conductivity (greater than 1,500 S/cm, more often >3,000 S/cm), a high thermal conductivity (greater than 600 W/mK, more often greater than 800 W/mK), a relatively high physical density (greater than 1.8 g/cm$^3$), and a relatively high tensile strength (greater than 40 MPa, often >80 MPa, and can be >120 MPa). Unidirectional carbon fiber reinforced graphene matrix composites can exhibit a tensile strength significantly higher than 200 MPa. The unitary graphene matrix composite also exhibits an exceptional surface hardness and scratch resistance, eliminating the tendency to flake off (to emit free carbon or graphite particles into air) which has been a serious problem associated with the flexible graphite foil and the recompressed graphene platelet foil.

The unitary graphene matrix of the present invention is often a single crystal (as schematically shown in FIG. 3(e)) or a poly-crystal with incomplete grain boundaries (e.g. schematically shown in FIG. 3(f)) which is essentially a graphene single crystal as well. By contrast, the prior art graphene film (single layer or few layer <2 nm thick) prepared by catalytic chemical vapor deposition (CVD) on a catalyst surface (Cu or Ni) is essentially poly-crystalline graphene with grain sizes typically <100 μm and more typically <10 μm. This CVD graphene film is intended for use as a semiconductor material (e.g. to replace Si in a FET transistor) or as a touch panel screen (e.g. to replace ITO glass used in a display device such as mobile phone screen). This CVD graphene is made by catalyst-assisted decomposition of hydrocarbon gas molecules and deposition of resulting carbon atoms on a Cu or Ni foil at a CVD temperature of typically 800-1,000° C. The electrical conductivity (<1,000 S/cm) and thermal conductivity (<500 W/mK) of the CVD graphene films are typically significantly lower than those of the presently invented graphene single crystals even though these CVD films are typically thinner than 2 nm and our graphene single crystals are typically thicker than 10 nm (often thicker than 10 μm).

As indicated above, flexible graphite foils prepared by re-compression of exfoliated graphite flakes or graphite worms exhibit relatively low thermal conductivity and mechanical strength. The graphite worms can be formed into flexible graphite foils by compression, without the use of any binding material, presumably due to the mechanical interlocking between the voluminously expanded graphite flakes. Although a significant proportion of these flakes are oriented in a direction largely parallel to the opposing surfaces of a flexible graphite sheet (as evidenced by the high degree of anisotropy with respect to thermal and electrical conductivity), many other flakes are distorted, kinked, bent over, or oriented in a direction non-parallel to these sheet surfaces (FIG. 2(b)). This observation has been well demonstrated in many scanning electron micrographs (SEM) published in open or patent literature. Furthermore, the presence of a large number of graphite flakes implies a large amount of interface between flakes, resulting in very high contact resistance (both thermal and electrical resistance).

As a consequence, the electrical or thermal conductivity of the resulting flexible graphite foils dramatically deviates from what would be expected of a perfect graphite single crystal or a graphene layer. For instance, the theoretical in-plane electrical conductivity and thermal conductivity of a graphene layer are predicted to be 1-5×10$^4$ S/cm and 3,000-5,000 W/(mK), respectively. However, the actual corresponding values for flexible graphite foils are 1-3×10$^3$ S/cm and 140-300 W/(mK), respectively; one order of magnitude lower than what could be achieved. By contrast, the corresponding values for the presently invented unitary graphene matrix composite containing separated expanded graphite flakes are approximately 3.5-20×10$^3$ S/cm (3,500-20,000 S/cm) and 600-1,800 W/(mK), respectively.

As a preferred embodiment of the present invention, the unitary graphene matrix composite comprises (a) a unitary graphene matrix containing graphene planes having an inter-graphene plane spacing of 0.335 to 0.40 nm and an oxygen content less than 1% by weight, which unitary graphene matrix is obtained from heat-treating a graphene oxide gel at a temperature higher than 500° C. and contains no discrete graphene platelets derived from the graphene oxide gel; (b) a carbon or graphite filler phase selected from a carbon or graphite fiber, carbon or graphite nano-fiber, carbon nano-tube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof. The carbon or graphite filler phase occupies a weight fraction from 1% to 90% based on the total composite weight and the carbon or graphite filler phase is preferably in a particulate, filamentary, or rod-like form dispersed in the unitary graphene matrix which forms a continuous phase.

The present invention also provides a highly thermally conductive unitary graphene matrix composite that can be used for thermal management applications; e.g. for use as a heat spreader in a microelectronic device (such as mobile phone, notebook computer, e-book, and tablet), flexible display, light-emitting diode (LED), power tool, computer CPU, and power electronics. We are filing separate patent applications to claim the various products or applications of the presently invented unitary graphene matrix composites.

Example 1

Preparation of Nano Graphene Platelets (NGPs) and Expanded Graphite Flakes

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin NGPs. The suspension was then filtered and dried at 80° C. to remove residue solvents. The as-prepared NGPs have an average thickness of approximately 9.7 nm.

Another five grams of the resulting exfoliated graphite (EG) were subjected to low-intensity air jet milling to break up graphite worms, forming expanded graphite flakes (having an average thickness of 139 nm).

Example 2

Preparation of Single-Layer Graphene from Meso-Carbon Micro-Beads (MCMBs)

Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene.

Example 3

Preparation of Pristine Graphene

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours.

Example 4

Preparation of Graphene Oxide (GO) Gel

Graphite oxide gel was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid, the suspension or slurry appears optically opaque and dark. The suspension remains opaque during the first 52 hours of reaction. However, the suspension gradually turns optically translucent (a little cloudy) when the reaction time exceeds 52 hours, and the color of the suspension changes from black to dark brown. After 96 hours, the suspension suddenly becomes an optically transparent solution with light brown color. The solution appears very uniform in color and transparency, indicating the absence of any dispersed discrete objects. The whole solution behaves like a gel, very similar to a typical polymer gel.

Surprisingly, by casting this gel on a glass surface and removing the liquid medium from the cast film we obtain a thin film of graphene oxide that is optically transparent. This thin film looks like, feels like, and behaves like a regular polymer film. However, upon re-graphitization at a temperature (typically >100° C., more typically >1,000° C., further typically >1,500° C., and can be >2,500° C.) for typically 1-3 hours, this GO film is transformed in a unitary graphene entity comprising or being a large-size graphene single crystal. This is a free-standing unitary graphene layer, which can be implemented directly as a heat spreader in an electronic device or used as a matrix material in a graphene matrix composite containing a carbon/graphite filler phase.

Figure 5A:
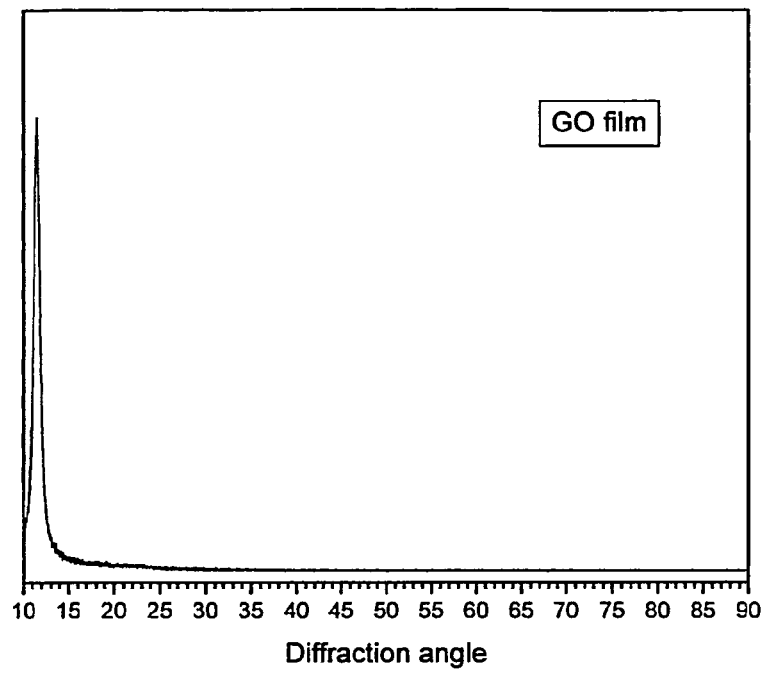
FIG. 5 X-ray diffraction curves of (a) a GO film, (b) GO film thermally reduced at 150° C. (partially re-graphitized), and (c) highly reduced and re-graphitized GO film (a unitary graphene layer).
Figure 5B:
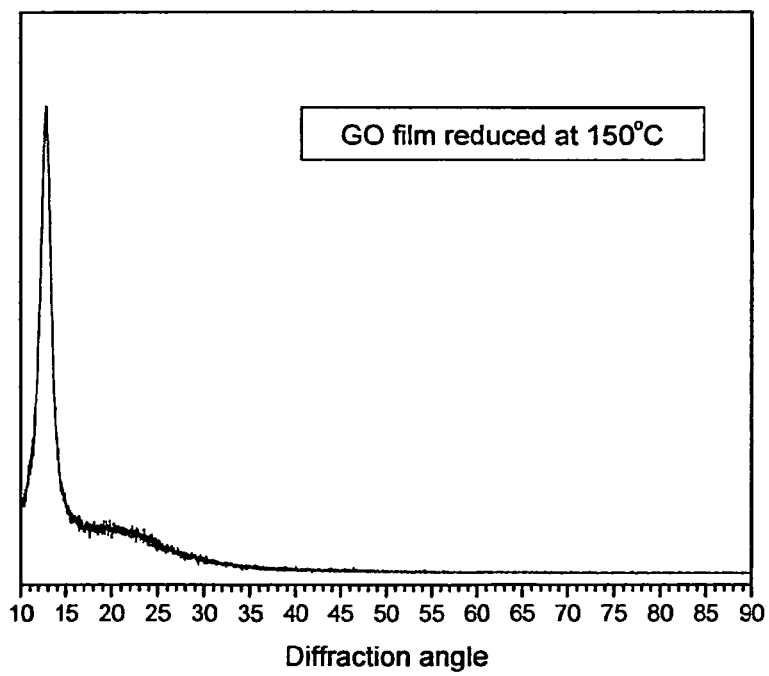
Figure 5C:
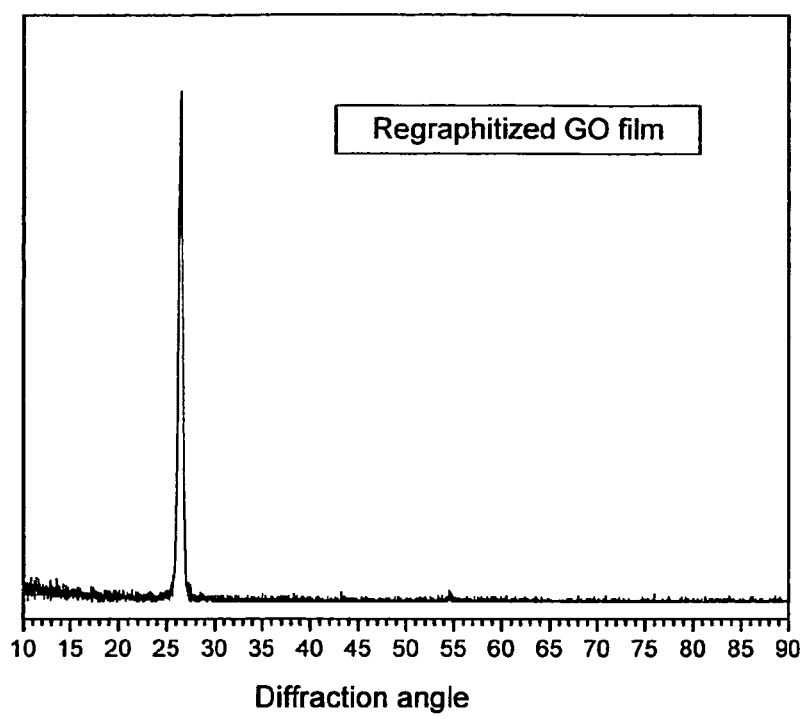

X-ray diffraction curves of a GO film (GO gel coated on a glass surface with liquid medium removed), a GO film thermally reduced at 150° C. for one hour, and a highly reduced and re-graphitized GO film (a unitary graphene layer) are shown in FIGS. 5(a), 5(b), and 5(c), respectively. The peak at approximately 2θ=12° of the dried GO film (FIG. 5(a)) corresponds to an inter-graphene spacing ($d_{002}$) of approximately 0.7 nm. With some heat treatment at 150° C., the GO film exhibits the formation of a hump centered at 22° (FIG. 5(b)), indicating that it has begun the process of decreasing the inter-graphene spacing, indicating a partial recovery of the original structure of natural graphite particles. With a heat treatment temperature of 2,500° C. for one hour, the $d_{002}$ spacing has decreased to approximately 0.336, close to 0.335 nm of the original natural graphite.

Figure 6A:
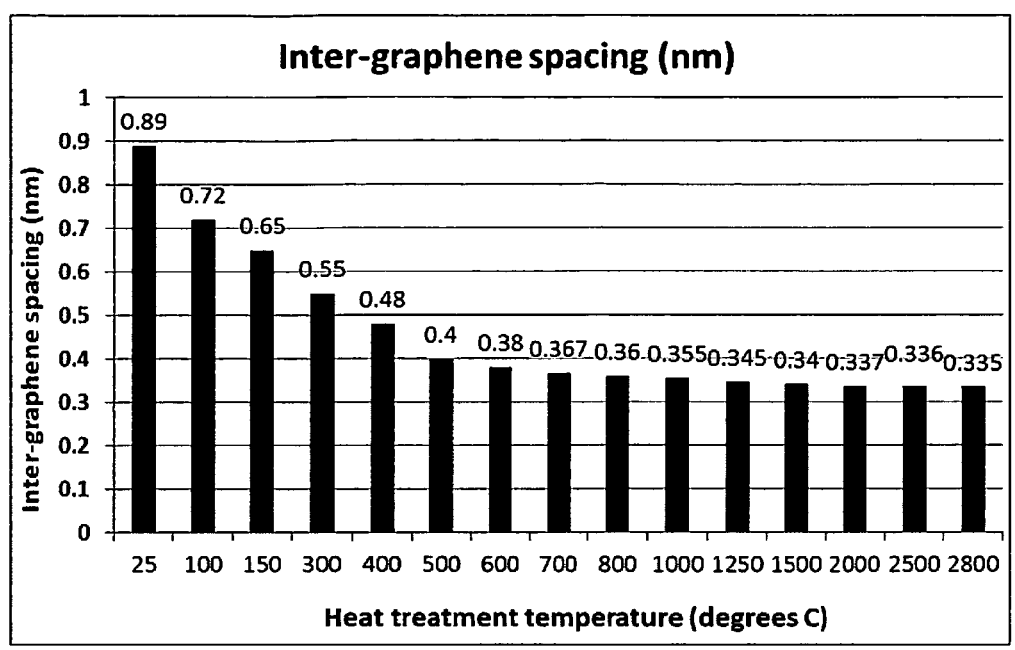
FIG. 6 (a) Inter-graphene plane spacing measured by X-ray diffraction; (b) the oxygen content in the GO-derived unitary graphene layer; and (c) thermal conductivity of GO-derived unitary graphene layer and corresponding flexible graphite (FG) foil, all plotted as a function of the final heat treatment temperature.
Figure 6B:
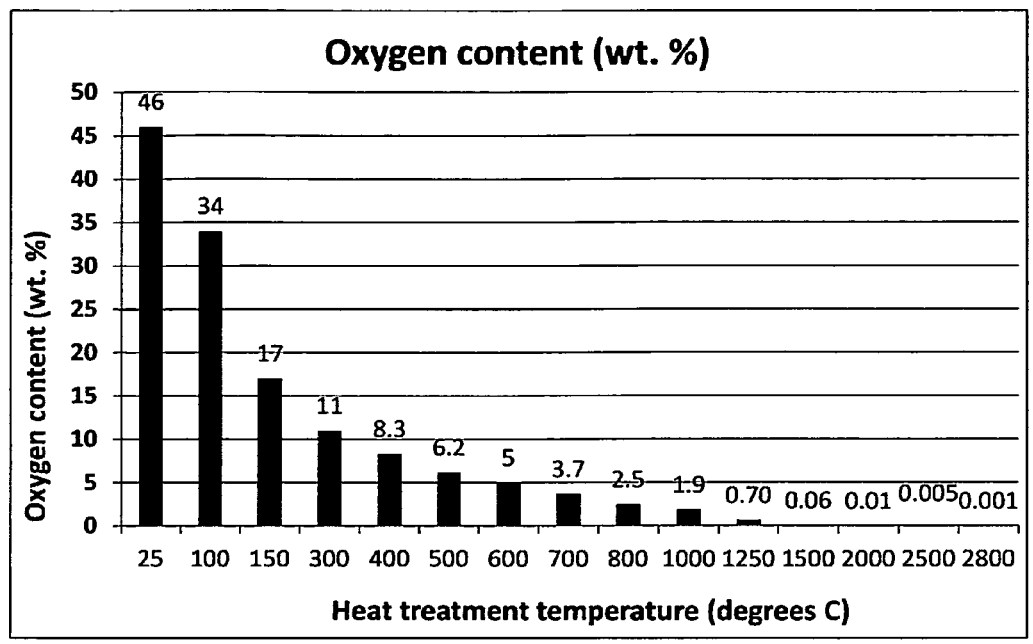
Figure 6C:
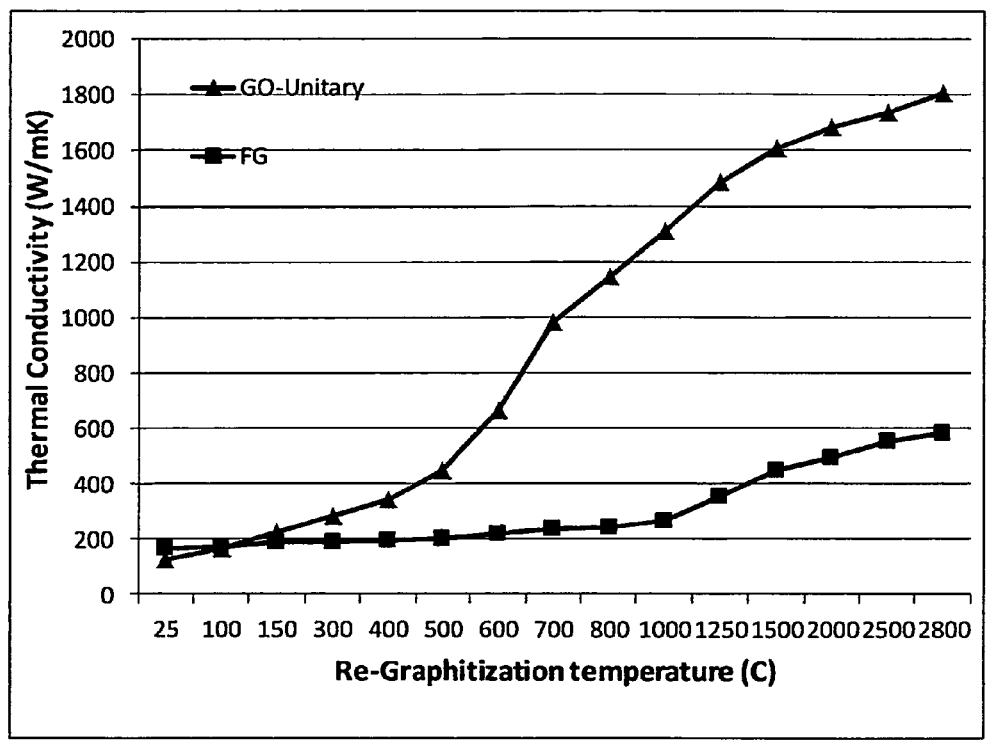

The inter-graphene spacing values of GO-derived unitary graphene films obtained by heat treating at various temperatures over a wide temperature range are summarized in FIG. 6(a). Corresponding oxygen content values in the GO-derived unitary graphene layer are shown in FIG. 6(b). The thermal conductivity of GO-derived unitary graphene layer and corresponding flexible graphite (FG) foil, also plotted as a function of the same final heat treatment temperature range is summarized in FIG. 6(c). It is of significance to point out that a heat treatment temperature as low as 500° C. is sufficient to bring the average inter-graphene spacing in GO back to below 0.4 nm, getting closer and closer to that of natural graphite. The beauty of this approach is the notion that this GO gel strategy has enabled us to re-organize, re-orient, and chemically merge the graphene planes of carbon atoms from originally different graphite flakes or graphene sheets into a graphene monolith with all the graphene planes now being larger in lateral dimensions (larger than the length and width of original graphene planes) and essentially parallel to one another. This has given rise to a thermal conductivity already >420 W/mK (>950 W/mk with a heat treatment temperature of 700° C.), which is more than 2- to 4-fold the value (200 W/mK) of the corresponding flexible graphite foil. These graphene planes of carbon atoms are derived and merged from the graphene planes that constitute the original natural graphite structure. The original natural graphite particles, when randomly packed into an aggregate or "graphite compact", have their constituent graphene planes randomly oriented, exhibit relatively low thermal conductivity, and have essentially zero strength (no structural integrity). In contrast, the strength of the unitary graphene layer is typically in the range of 40-140 MPa.

With a heat treatment temperature as low as 800° C., the resulting unitary graphene layer exhibits a thermal conductivity of 1,148 W/mK, in contrast to the 244 W/mK of the flexible graphite foil with an identical heat treatment temperature. As a matter of fact, no matter how high the heat treatment temperature is (e.g. even as high as 2,800° C.), the flexible graphite foil only shows a thermal conductivity lower than 600 W/mK. At a heat treatment temperature of 2,800° C., the presently invented unitary graphene layer delivers a thermal conductivity of 1,807 W/mK (FIG. 4(a) and FIG. 6(c)).

Figure 2A:
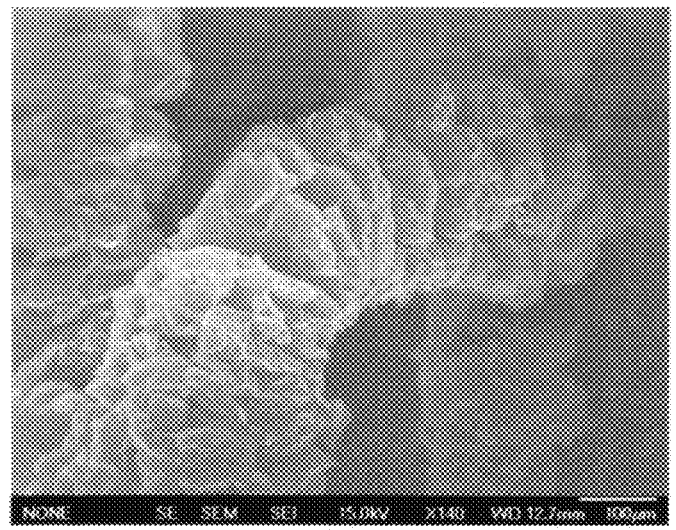
FIG. 2 (a) A SEM image of a graphite worm sample after thermal exfoliation of graphite intercalation compounds (GICs) or graphite oxide powders; (b) An SEM image of a cross-section of a flexible graphite foil, showing many graphite flakes with orientations not parallel to the flexible graphite foil surface and also showing many defects, kinked or folded flakes.
Figure 2B:
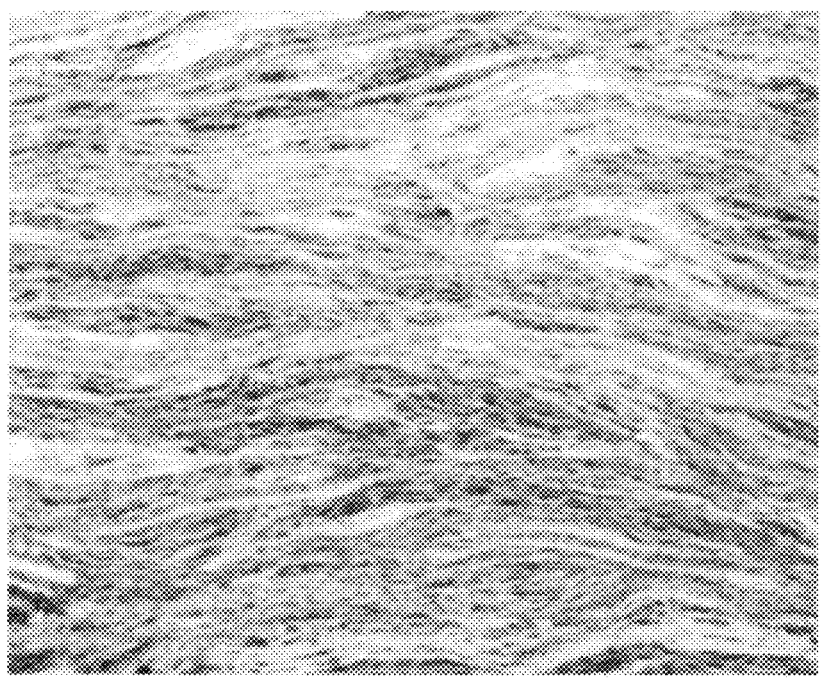

A close scrutiny and comparison of FIGS. 2(a), 3(a), and 3(b) indicates that the graphene layers in a graphene single crystal or graphene monolithic are substantially oriented parallel to one another; but this is not the case for flexible graphite foils and graphene oxide paper. The inclination angles between two identifiable layers in the unitary graphene entity are mostly less than 5 degrees. In contrast, there are so many folded graphite flakes, kinks, and mis-orientations in flexible graphite that many of the angles between two graphite flakes are greater than 10 degrees, some as high as 45 degrees (FIG. 2(b)). Although not nearly as bad, the mis-orientations between graphene platelets in NGP paper (FIG. 3(b)) are also high and there are many gaps between platelets. The unitary graphene entity is essentially gap-free.

FIG. 4 (a) shows the thermal conductivity values of the GO-derived unitary graphene matrix layer (▲), GO paper (■) prepared by vacuum-assisted filtration of RGO, and FG foil (♦), respectively, all plotted as a function of the final heat treatment temperature for graphitization or re-graphitization. These data have clearly demonstrated the superiority of the unitary graphene layer or graphene single crystal in terms of the achievable thermal conductivity at a given heat treatment temperature. All the prior art work on the preparation of paper or membrane from pristine graphene or graphene oxide sheets/platelets follows distinctly different processing paths, leading to a simple aggregate or stack of discrete graphene or GO/RGO platelets. These simple aggregates or stacks exhibit many folded graphite flakes, kinks, gaps, and mis-orientations, resulting in poor thermal conductivity, low electrical conductivity, and weak mechanical strength. As shown in FIG. 4(a), even at a heat treatment temperature as high as 2,800° C., the GO paper exhibits a thermal conductivity less than 1,000 W/mK, much lower than the >1,800 W/mK of the GO gel-derived unitary graphene entity.

For comparison, we also carbonized polyimide films at 500° C. for 1 hour and at 1,000° C. for 3 hours in an inert atmosphere and then graphitized the films at a temperature in the range of 2,500-3,000° C. for 1 to 5 hours to form a conventional graphitic film, pyrolytic graphite (PG). FIG. 4(b) shows the thermal conductivity values of the GO-derived unitary graphene layer (■) and the polyimide-derived pyrolytic graphite (PG) heat-treated for one hour (x) and for 3 hours (▲), all plotted as a function of the final graphitization or re-graphitization temperature. These data show that the conventional pyrolytic graphite (PG), produced by carbonizing polyimide and then graphitizing the carbonized PI, exhibits a consistently lower thermal conductivity as compared to the GO-derived unitary graphene layer alone (■), given the same heat treatment (graphitization or re-graphitization) temperature for the same length of heat treatment time. For instance, the PG from PI exhibits a thermal conductivity of 820 W/mK after a graphitization treatment at 2,000° C. for one hour and 1,242 W/mK at 2,000° C. for 3 hours. These observations have demonstrated a clear and significant advantage of using the GO gel approach versus the conventional PG approach. As a matter of fact, no matter how long the graphitization time is for the PG, the thermal conductivity is always lower than that of a GO gel-derived unitary graphene layer. In other words, the unitary graphene layer is fundamentally different and patently distinct from the flexible graphite (FG) foil, graphene/GO/RGO paper/membrane, and pyrolytic graphite (PG) in terms of chemical composition, structure, morphology, process of production, and properties.

Figure 4A:
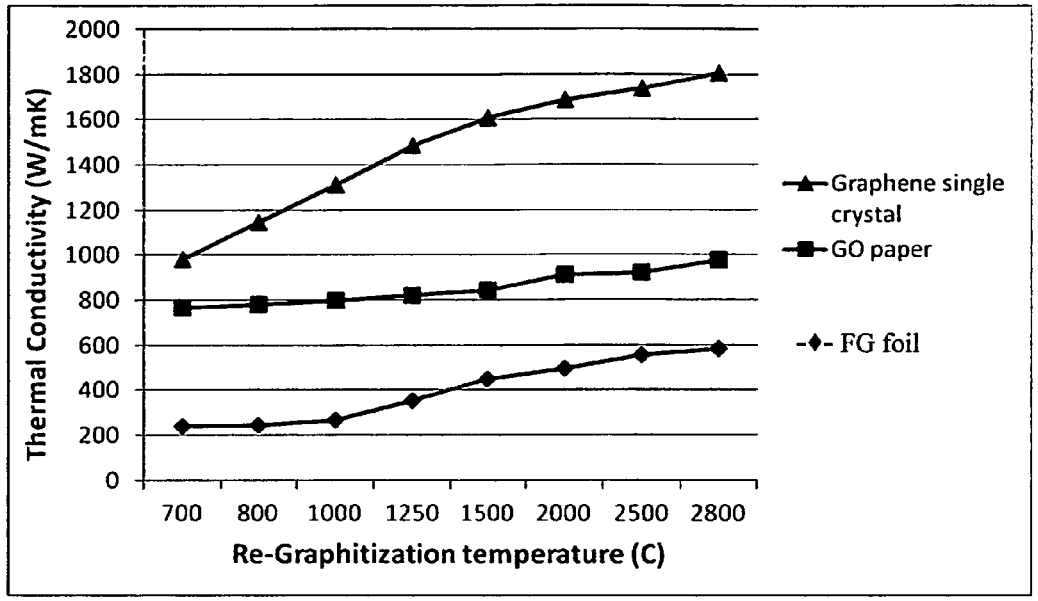
FIG. 4 (a) Thermal conductivity values of the GO-derived single unitary graphene layer (▲), GO paper (■), and FG foil (♦) plotted as a function of the final heat treatment temperature for graphitization or re-graphitization; (b) Thermal conductivity values of the GO-derived unitary graphene layer (■) and the polyimide-derived pyrolytic graphite (PG) heat-treated for one hour (x) and for 3 hours (▲), all plotted as a function of the final graphitization or re-graphitization temperature; (c) Electric conductivity values of the GO-derived unitary graphene layer (♦), GO paper (■), and FG foil (x) plotted as a function of the final graphitization or re-graphitization temperature; (d) thermal conductivity values of unitary graphene layer only, unitary graphene/CNT composite, GO paper (prepared from GO platelets not reaching a GO gel state), and GO/CNT paper or membrane; (e) thermal conductivity values of unitary graphene layer only, unitary graphene/CB composite, GO paper (prepared from GO platelets not reaching a GO gel state), and GO/CB paper or membrane. Note: symbol designations varied from (a) to (d).
Figure 4B:
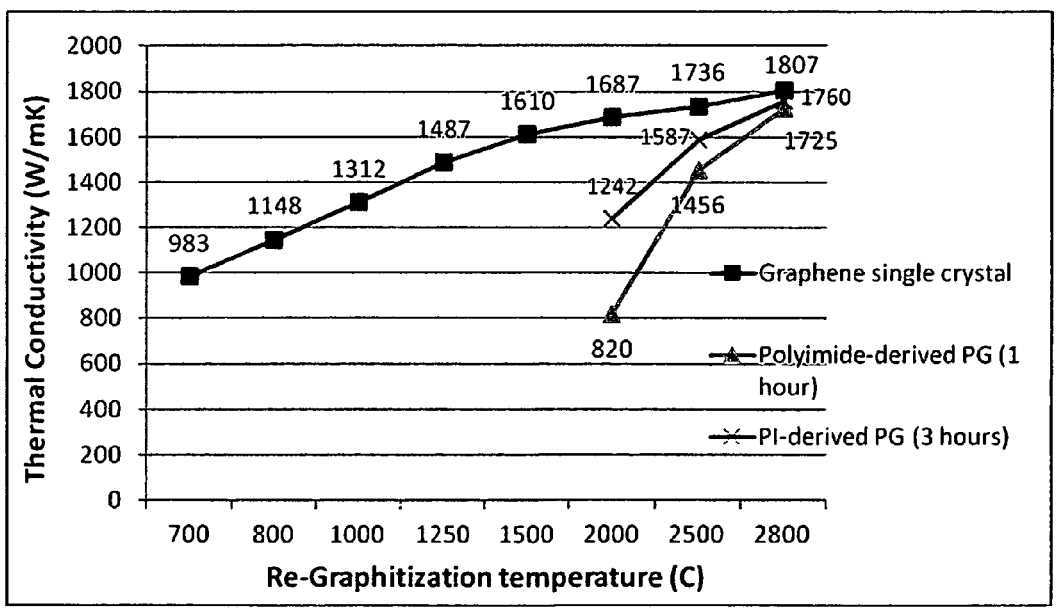
Figure 4C:
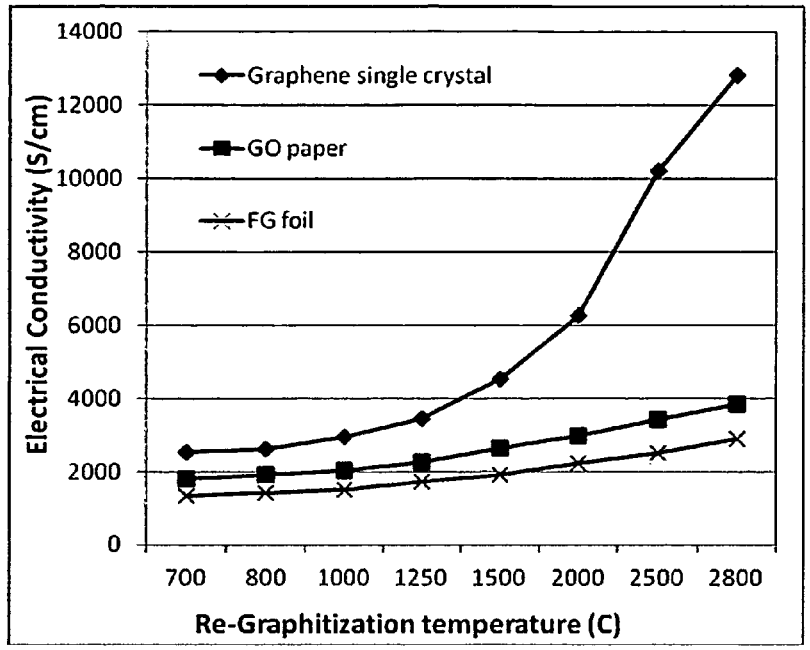

The above conclusion is further supported by the data in FIG. 4(c) showing the electric conductivity values of the GO-derived unitary graphene layer (♦) are far superior to those of the GO paper (■) from RGO platelets and FG foil (x) over the entire range of final graphitization or re-graphitization temperatures investigated.

Examples 5

Preparation and Testing of Graphene Matrix Composites

GO gel can be combined with a carbon/graphite filler phase to form a graphene matrix composite. The graphene oxide gel prepared in Example 4 was used for the preparation of graphene matrix composite. The exfoliated graphite flakes prepared in Examples 1 were made into thin porous paper or film form (e.g., using a vacuum-assisted filtration technique) for use as a carbon/graphite filler. Other carbon or graphite fillers investigated include carbon nano-tubes and CNT paper (Bucky paper from Buckeye Composites, Inc., Dayton, Ohio), carbon nano-fibers and CNF mats (CNFs supplied from Applied Sciences, Inc., Cedarville, Ohio), flexible graphite foils of several different thicknesses (supplied from Graftech and Timcal Graphite), carbon fibers and carbon fiber mats, woven fabrics of graphite fibers, carbon paper (Toray), MCMB particles, carbon black (CB), acetylene black (AB), and needle coke.

Two approaches were adapted to produce graphene matrix composites. In the first approach, the particles of the carbon/graphite filler phase were formed into porous pre-forms, such as porous paper, mat, and fabric (woven or non-woven). The porous pre-form was then impregnated with GO gel, which was followed by drying and heat treating.

In a second approach, discrete particles or fibers of the carbon/graphite filler phase were added into the GO gel to form a mixture gel or gel slurry. Pure GO gel or carbon/graphite filler-GO mixture gel or slurry was then cast onto a solid substrate surface using a coating machine equipped with drying and heating provisions. In some cases, the GO gel or filler-GO gel mixture was casted onto a substrate and regulated by a doctor's blade to form a uniform coating thereon. The liquid in the coating was further removed in a vacuum oven to form a solid GO coating. The resulting GO or GO-filler layers were then subjected to a heat treatment at a temperature of from 100° C. up to approximately 3,000° C. We have utilized several temperature regimes: 100° C.-1,000° C.; 1,000° C.-1,500° C.; 1,500° C.-2,500° C.; and 2,500° C.-3,000° C.

Examples 6

Electrical and Thermal Conductivity Measurements of Various Graphene Oxide-Derived Unitary Graphene and Graphene Matrix Composite Layers Four-point probe tests were conducted on unitary graphene matrix composites (e.g. containing CNT, expanded graphite flakes, carbon black, etc), the GO-derived unitary graphene layer alone (coated on a glass surface and then peeled off and heat treated), GO/RGO paper, and the FG foils alone to measure their in-plane electrical conductivity. Their in-plane thermal conductivity was measured using a laser flash method (Netzsch Thermal Diffusivity Device).

The in-plane thermal and electrical conductivities and tensile properties of various films or laminates were investigated. Several significant observations can be made from the testing results (e.g. as summarized in FIGS. 4(d), 4(e), 8(a), 8(b), 9(a), and 9(b)):

(1) With a thickness of approximately 75 µm, the thermal conductivity of the flexible graphite foil alone (FG, ▲ in FIG. 4(a)) is less than 237 W/mK if the FG foil is not heat-treated at or above 700° C. As the post-recompression heat treatment temperature increases from 700° C. to 2,800° C. (for one hour of graphitization treatment in each case), the thermal conductivity of the FG foil increases from 237 to 582 W/mK, indicating some but limited re-organization of the graphitic structure induced by the heat treatment. By contrast, the thermal conductivity of the GO-derived unitary graphene layer alone increases from 983 to 1,807 W/mK (■ in FIG. 8(a)). This unitary graphene matrix material is obtained by shearing and depositing a layer of GO gel on a glass surface, removing the liquid from the GO layer in vacuum for 1 hour, and peeling off the dried solid GO layer from the glass surface. This indicates a significant or dramatic re-organization of the graphitic structure induced by the heat treatment, with all GO molecules linked or merged edge-to-edge and face-to-face into unitary graphene layers and integrated into a unitary entity of fully and orderly bonded graphene planes, a graphene single crystal.

Figure 8A:
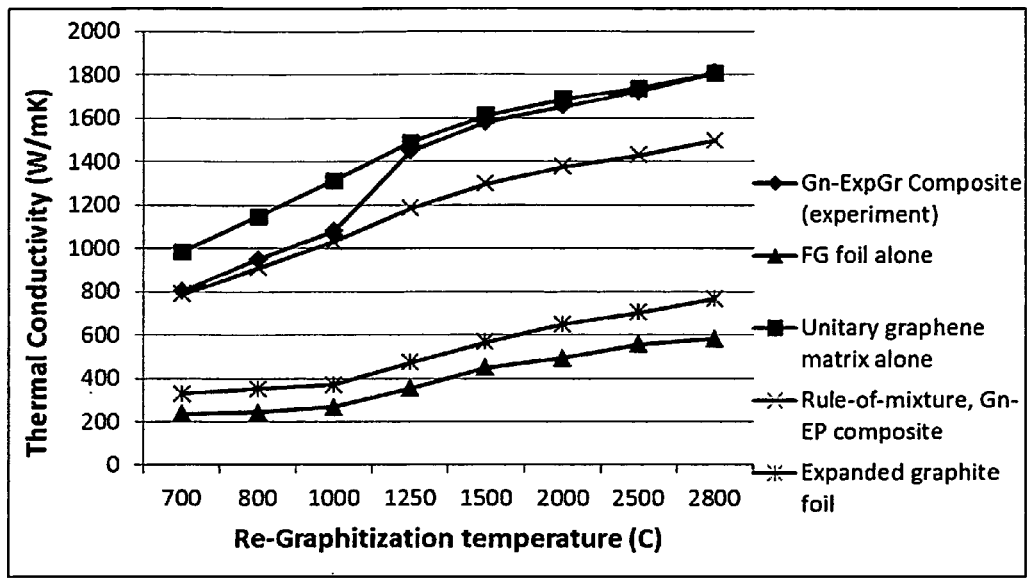
FIG. 8 (a) Thermal conductivity values of the GO-derived unitary graphene layer alone (■), unitary graphene-expanded graphite composite (♦, experimental values), expanded graphite foil alone (exfoliated graphite worms broken up into separated graphite flakes and re-compressed into foil) and FG foil alone (▲, re-compressed worms without worm break-up and flake separation as a point of reference) plotted as a function of the final graphitization or re-graphitization temperature, along with theoretically predicted values (x, unitary graphene-expanded graphite composite) based on a rule-of-mixture law (graphitization time=1 hour for all specimens); (b) Thermal conductivity values of the GO-derived unitary layer alone (■), unitary graphene-expanded graphite composite (♦), and polyimide-derived pyrolytic graphite (PG) plotted as a function of the final graphitization or re-graphitization temperature for one hour, along with those of PG graphitized for 3 hours.

(2) The experimentally measured thermal conductivity of a corresponding series of GO-derived unitary graphene matrix composite containing expanded graphite flakes as the filler phase (♦ in FIG. 8(a)) increases from approximately 800 to 1,800 W/mK. This is significantly higher than the thermal conductivity values of what would be theoretically predicted (x in FIG. 8a)) from a rule-of-mixture law, which is commonly used to predict composite properties from constituent properties. These data have clearly demonstrated an un-expected, synergistic effect between GO-derived unitary graphene matrix (derived from graphene oxide gel) and the dispersed expanded graphite flakes.

Also shown in FIG. 8(a) are the thermal conductivity data of corresponding flexible graphite foil (FG prepared by roll-pressing of exfoliated graphite worms) and foil of expanded graphite flakes (prepared by breaking up graphite worms into graphite flakes as described in Example 1, which were then packed and roll-pressed into a thin foil). The highest thermal conductivity value achievable with the expanded graphite foil is <800 W/mK and that with FG is <600 W/mK, both being dramatically lower than those of both the unitary graphene matrix and the graphene matrix composite.

Figure 8B:
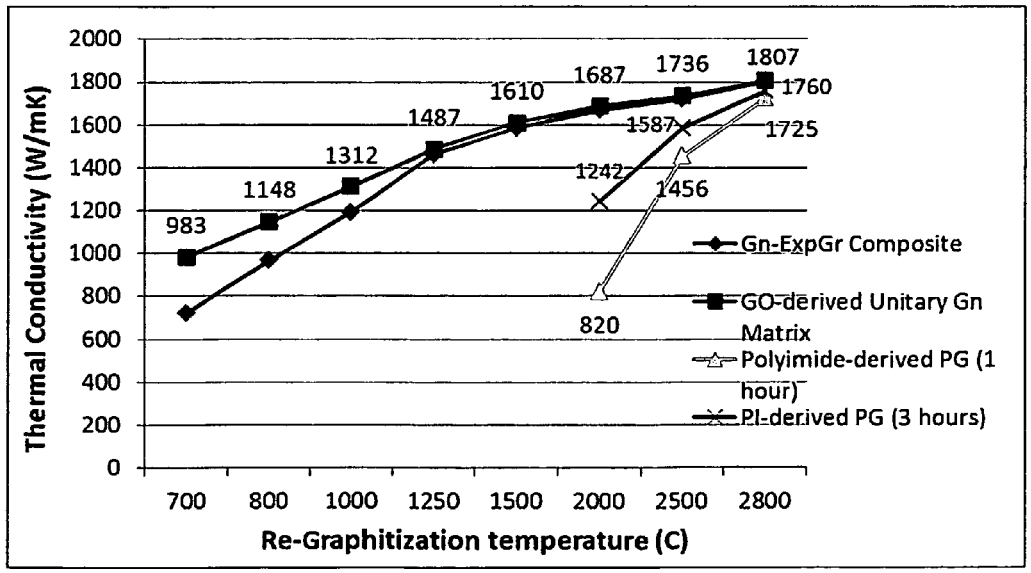

(3) FIG. 8(b) shows that the conventional pyrolytic graphite (PG), produced by carbonizing polyimide, roll-pressing, and then graphitizing the carbonized PI, exhibits a consistently lower thermal conductivity as compared to the GO-derived unitary graphene layer alone (■) or unitary graphene matrix composite (♦), given the same heat treatment (graphitization or re-graphitization) temperature for the same length of heat treatment time. For instance, the PG from PI exhibits a thermal conductivity of 820 W/mK after a graphitization treatment at 2,000° C. for one hour and 1,242 W/mK at 2,000° C. for 3 hours. These observations have demonstrated a clear and significant advantage of using the GO gel approach versus the conventional PG approach. As a matter of fact, no matter how long the graphitization time is for the PG, the thermal conductivity is always lower than that of a GO gel-derived unitary graphene or unitary graphene matrix composite. Clearly, both the GO-derived unitary graphene layer and unitary graphene matrix composite are fundamentally different and patently distinct from the pyrolytic graphite in terms of chemical composition, structure, morphology, process of production, and properties.

Figure 4D:
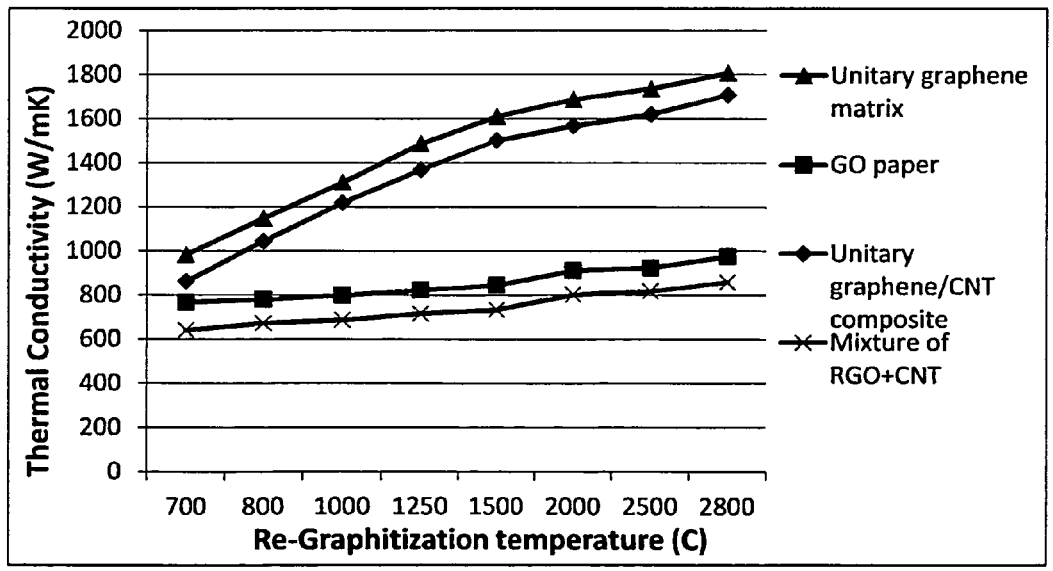
Figure 4E:
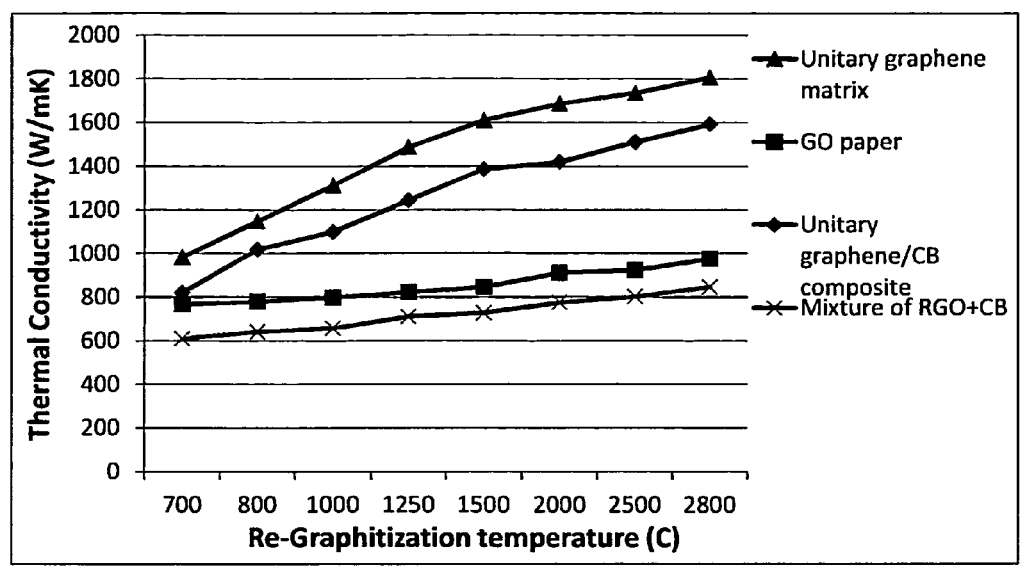

(4) FIG. 4(d) shows the thermal conductivity values of both unitary graphene matrix and graphene matrix-CNT composite are far superior to those of prior art GO paper containing discrete GO platelets and those of GO paper containing an equal proportion of the same CNTs (approximately 26% by weight). FIG. 4(e) demonstrates that unitary graphene matrix composite containing carbon black particles as the carbon/graphite filler phase are significantly higher than those of prior art GO paper and corresponding GO-CB paper.

Examples 7

Tensile Strength of Various Graphene Oxide-Derived Unitary Graphene Matrix Composites A series of GO-derived unitary graphene layers, graphene matrix composites, GO paper, and FG foil were prepared. A universal testing machine was used to determine the tensile strength of these materials. The tensile strength values of the unitary graphene entity, GO paper, and FG paper are plotted as a function of the re-graphitization temperature, FIG. 9(a). These data have demonstrated that the tensile strength of the flexible graphite foil remains relatively constant (all <20 MPa) and that of the GO paper increases slightly (from 22 to 43 MPa) when the heat treatment temperature increases from 700 to 2,800° C. In contrast, the tensile strength of the GO-derived unitary graphene layer increases dramatically from 32 to >100 MPa over the same range of heat treatment temperatures. This result is quite striking and further reflects the notion that the GO gel-derived GO layer contains highly alive and active molecules during the heat treatment, while the graphene platelets in the GO paper and the graphite flakes in the FG foil are essentially dead molecules. The GO-derived unitary graphene entity or graphene single crystal is a class of material by itself.

The tensile strength values of three unitary graphene matrix composites with the final re-graphitization temperature of 1,500° C. are plotted as a function of the filler weight fraction for three carbon/graphite filler types: CNT, expanded graphite flakes, and carbon black particles (FIG. 9(b)). Although adding CNTs to the unitary graphene matrix decreases the thermal conductivity (FIG. 4(d)), the strength of the resulting composites increases monotonically with (actually proportional to) the CNT weight fraction, reaching a value of 200 MPa that is one order of magnitude higher than the typical strength of flexible graphite-type materials. This is completely unexpected.

This appears to suggest that GO molecules have a strong adhering power capable of bonding to CNTs, creating a strong interfacial bond to assist in the load transfer and enabling CNTs to carry a significant proportion of the mechanical force imposed upon the composite. It may be noted that epoxy matrix composites containing multi-walled carbon nanotubes as the reinforcement phase have never exhibit a tensile strength higher than 80 MPa. This is partially due to the difficulty of dispersing CNTs in a polymer, to the extent that it has been extremely difficult to well-disperse more than 5% by weight of CNTs in epoxy. Beyond 5% by weight, CNTs could not be homogeneously dispersed in epoxy and the tensile strength actually begins to decrease with increasing CNT weight percentage. The observation that CNTs can be well dispersed in the graphene matrix up to 30% by weight is shocking, indicating outstanding chemical compatibility between GO molecules and discrete CNT filaments. Further shocking is the 200 MPa tensile strength exhibited by the graphene matrix-CNT composite, a value that no reinforced epoxy composite has been able to achieve unless the reinforcement phase (such as high-strength carbon fibers) is well aligned in the loading direction (e.g. in a unidirectional fiber composite).

Examples 8

The Surface Scratch Resistance (in Terms of Scratch Visibility and Scratch Depth), and Hardness of Various Unitary Graphene Matrix Composites The scratch test was conducted using the so-called Ford Lab Test Method (FLTM) BN108-13. This apparatus consists of a movable platform connected to five beams with 250 mm in length. A scratch pin is attached to one end of each beam. A highly polished hardened steel ball (1.0±0.1 mm diameter) is placed on the tip of each pin. Each pin is loaded with a weight that exerts a force of 7N, 6N, 3N, 2N, and 0.6N, respectively. Driven by compressed air, the beams draw the pins across the specimen surface and generate scratches. The scratch is made at a sliding velocity of approximately 100 mm/s. All tests were performed at room temperature. Although the test method requires that grained surfaces be evaluated, only the smooth surfaces of the specimens were tested in this study.

After the specimen plaques were scratched, they were evaluated with a reflected light polarizing microscope incorporating a Xenon light source. An image analyzer with Image Analysis Software was used to measure the "gray scale mass," which is the total gray scale value of the object. The camera objective lens is positioned at an angle of 90° from the scratch. The objective lens then registers a portion of the scratch about 1 mm long. The electron signal for each scratch line is then integrated and recorded. The optical mass of an object, M, is the sum of the gray level values, GL, of all pixels in the object. The individual gray level values are assigned by the image analysis program in unit steps in the range of 0-255, where 0=black and 255=white. The optical mass, M, can be computed from: $M=\Sigma GL_i$ (sum over i to n), where n is the number of pixels. The brightness of the object, B, is $B=M/A$, where A represents the area of the object. The percentage change in the brightness between the scratch and the background is the scratch visibility, $\Delta B$, given by $\Delta B=[(B_{scratch}-B_{background})/(B_{background})]\times 100\%$. The depth of the scratch was measured using an interferometer. The magnification was set at 5×. Depth measurements were made from the depth histogram of the scanned area. The scratches were also examined using a scanning electron microscope (SEM).

Indentation hardness tests were also performed on selected specimens. For the Rockwell Hardness test, the ASTM D 785 test procedure was followed. The indenter was a round steel ball with 12.5 mm in diameter (Rockwell R scale). The Rockwell hardness number is a measure of the non-recoverable indentation after a heavy load of 588N for a period of 15 s, and subsequently reduced to a minor load of 98N for another duration of 15 s. Normal hardness is then defined as the load divided by the projected area.

Figure 9A:
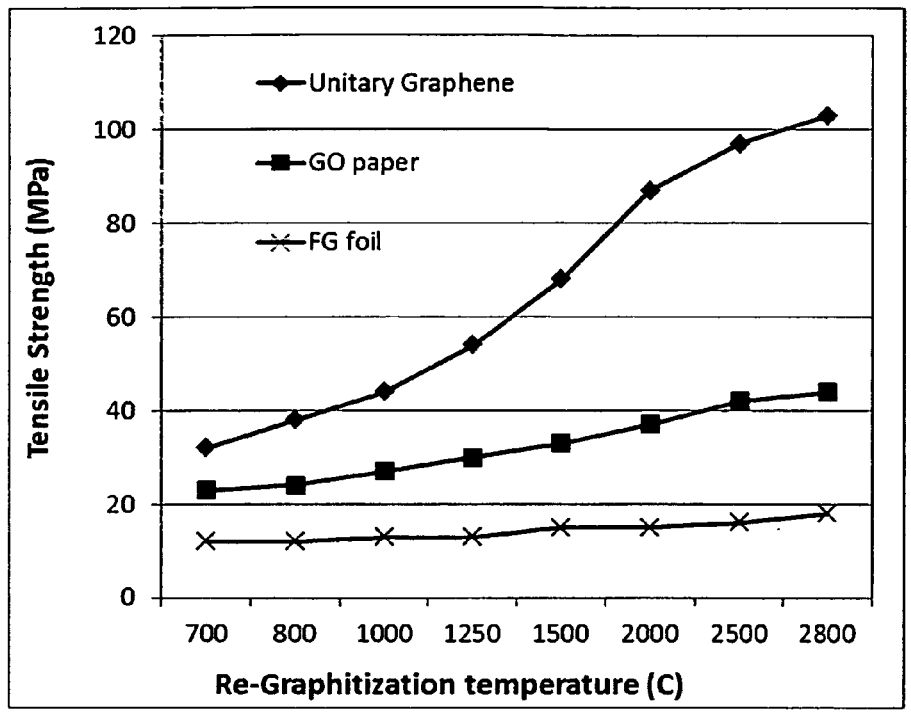
FIG. 9 (a) Tensile strength of unitary graphene matrix material from GO gel, GO (not from gel state), and flexible graphite foil over a range of heat treatment temperatures; (b) Tensile strength and (c) Rockwell hardness values of unitary graphene/CNT composites, unitary graphene/expanded graphite composites, and unitary graphene/carbon black composites plotted as a function of the filler weight percentage, and (d) Rockwell hardness of unitary graphene matrix material only and its CNT-reinforced version plotted as a function of the heat treatment temperature.
Figure 9B:
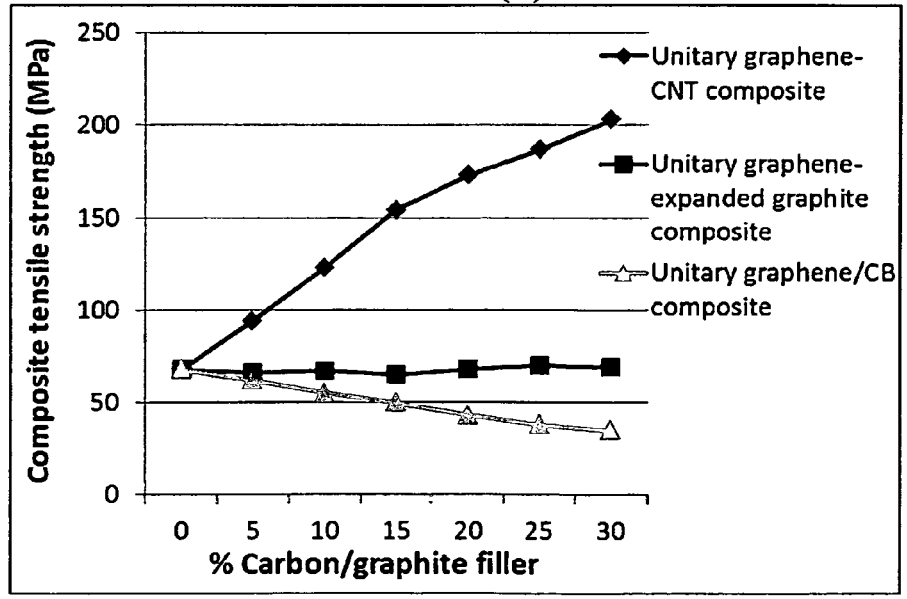
Figure 9C:
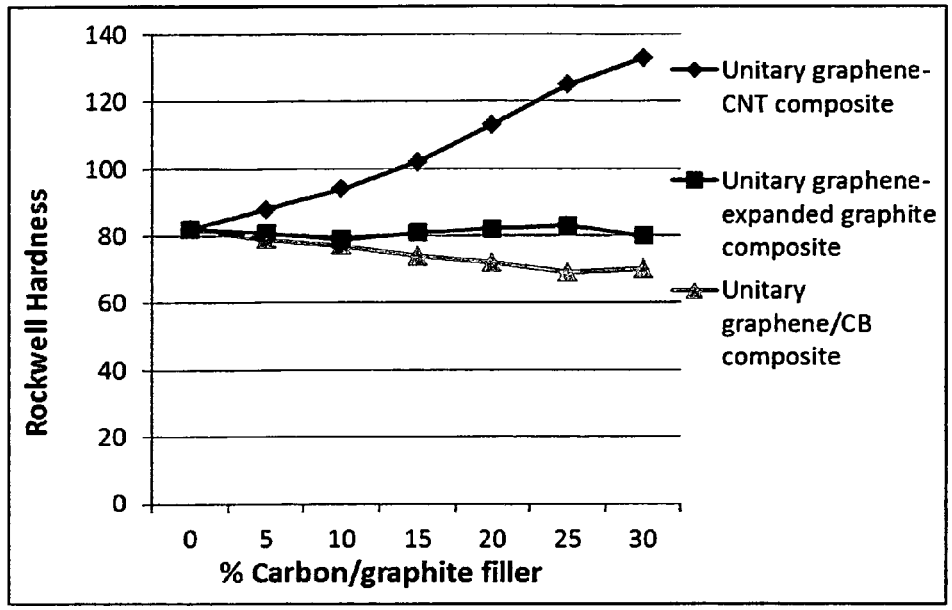
Figure 9D:
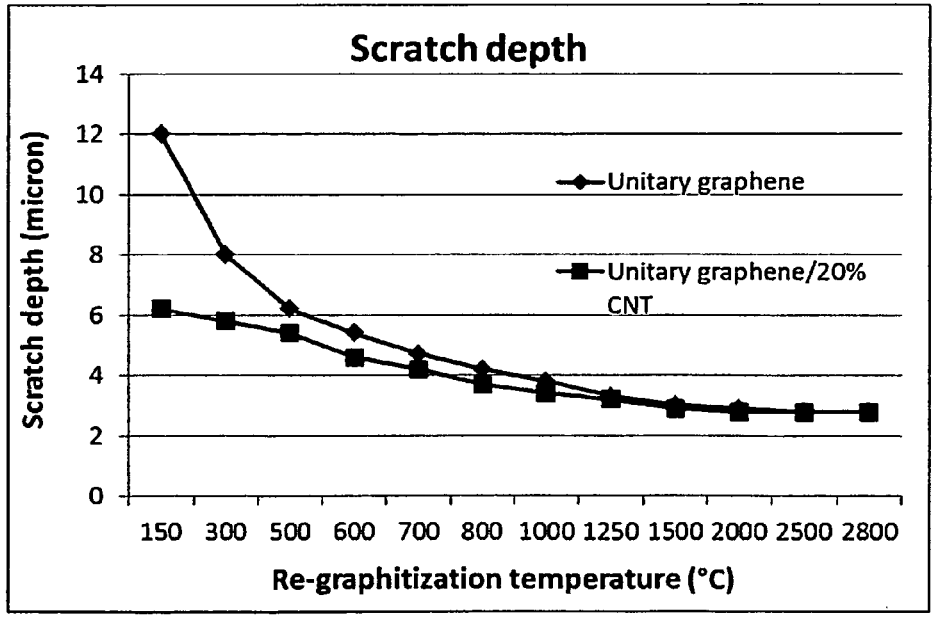

FIGS. 9(c) and 9(d) show the Rockwell hardness and scratch depth data, respectively, of several graphene matrix composites plotted as a function of the filler weight percentage (FIG. 9(c)) and re-graphitization temperature (FIG. 9(d)). The Rockwell hardness data in FIG. 9(c) are found to be well correlated with the tensile strength data of FIG. 9(b). Again, the presence of CNTs can significantly increase the hardness of the unitary graphene matrix. The scratch resistance of the unitary graphene matrix can also be significantly improved by adding some CNT (20% by weight as in FIG. 9(d)). This improvement is diminished as the final re-graphitization temperature exceeds 1,000 C wherein the unitary graphene matrix alone is already of high strength and hardness.

Examples 9

Heat Dissipation Systems Containing a Graphene Oxide-Derived Unitary Graphene

Figure 7:
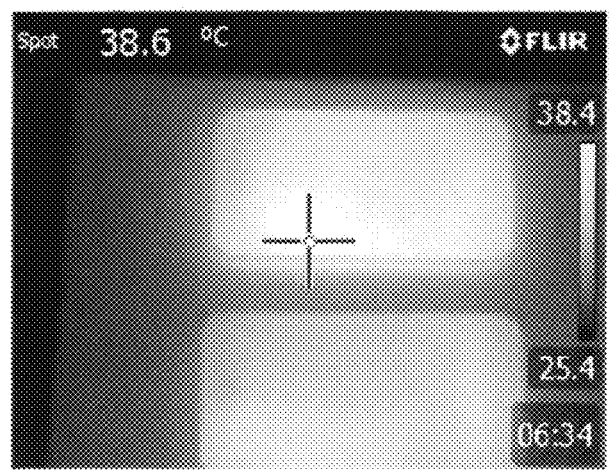
FIG. 7 Surface temperature fields of two identical smart phones running the same video programs for 10 minutes. One smart phone (top image) contains 2 sheets of flexible graphite (FG) foils disposed between the CPU and the casing, showing an external surface temperature as high as 38.6° C. The other smart phone (bottom image) contains one sheet of unitary graphene layer-coated FG foil, showing an external surface temperature of 25.4° C.

We have used an infrared thermography-based hand-help device to measure the surface temperatures of a range of microelectronic devices, such as smart phones and laptop computer. For instance, FIG. 7 shows the surface temperature fields of two identical smart phones running the same video programs for 10 minutes. One smart phone (top image) contains 2 sheets of flexible graphite (FG) foils between the CPU and the casing, showing an external surface temperature as high as 38.6° C. The internal temperature near the CPU is presumably much higher than 60 or 70° C., a dangerous temperature that could eventually damage the device. In contrast, the other smart phone (bottom image) contains one sheet of GO-derived unitary graphene-coated FG foil, showing an external surface temperature of 25.4° C. This example has vividly demonstrated the effectiveness of implementing a unitary graphene-based material as a heat-spreader layer in a thermal management system. A similar improvement was observed when a layer of graphene matrix composite containing graphite flake filler was used.

Examples 10

Thermal and Electrical Properties of Various Unitary Graphene Matrix Composites

The thermal and electric conductivities of graphene matrix composites containing various carbon or graphite fillers in different forms are summarized in Table 1 below. Given the same final heat treatment temperature, all the graphene matrix composites exhibit better electric and thermal conductivities as compared to the baseline flexible graphite foil and GO paper.

TABLE 1

In-plane thermal and electric conductivities

| Sample No. | Re-graphitization temperature (° C.) | Filler type, form, and wt. % | Thermal conductivity (W/mK) | Electric conductivity (S/cm) |
|---|---|---|---|---|
| 31-G | 1,500 | None | 1,610 | 4,200 |
| 31-G-AB | 1,500 | Acetylene black particles, dispersed, 35% | 946 | 3,550 |
| 31-G-MCMB | 1,500 | Particles, dispersed, 25% | 1,156 | 3,605 |
| 31-G-Coke | 1,500 | Needle coke, dispersed, 25% | 1,028 | 3,002 |
| 32-G | 2,500 | None | 1,736 | 10,300 |
| 32-G-CNF | 2,500 | CNF, mat, 10% | 1,550 | 9,213 |
| 32-G-CF-Uni | 2,500 | Continuous carbon fibers, unidirectional, 55% | 1,250 | 7,250 |
| 32-G-CF-W | 2,500 | Continuous carbon fibers, woven fabric, 54% | 1,143 | 6,037 |
| 32-G-CF-Ch | 2,500 | Chopped carbon fiber, mat, 45% | 1,057 | 5,454 |
| 32-G-AC | 2,500 | Activated carbon, dispersed, 15% | 1,611 | 9,763 |
| FG foil | 2,500 | — | 560 | 2,300 |
| GO paper | 2,500 | — | 920 | 3,500 |

As indicated in FIGS. 8(a) and 8(b), the presently invented unitary graphene matrix composites do not have to go through an ultra-high-temperature graphitization treatment to achieve a high thermal conductivity (e.g. K already=988 W/mK with T=800° C. and K=1,487 W/mK with T=1,250° C.). Graphitization of a carbonized resin (e.g. polyimide) or other carbon materials requires a temperature typically higher than 2,000° C., most typically higher than 2,500° C. The graphitization temperature is most typically in the range of 2,800-3,200° C. in order for carbonized materials or pyrolytic graphite to achieve a thermal conductivity of 1,600-1,700 W/mK. In contrast, the typical heat treatment temperature (re-graphitization treatment) of the presently invented GO-coated laminates is significantly lower than 2,500° C. and more typically lower than 1,500° (can be as low as 100-150° C.).

For instance, polyimide (PI), if carbonized and graphitized for 5 hours (including 4 hours for carbonization at 1,000-1, 500° C. and 1 hour for graphitization at 2,000° C.), exhibits a thermal conductivity of 820 W/mK. In contrast, we were able to reach a thermal conductivity of 988 W/mK with a heat treatment of graphene matrix composite at 800° C. for a total of two hours. This is very surprising and no one has ever thought that such a low graphitization temperature was possible. Further, a heat treatment of the GO-derived unitary graphene-matrix composite at the same 2,000° C. for 1 hour imparts a thermal conductivity of 1,680 W/mK (vs. 820 W/mK of the carbonized PI). Clearly, this is a dramatically faster, less energy-intensive, and more cost-effective process. The resulting products are also far superior to pyrolytic graphite. The unitary graphene matrix composites, the unitary graphene layer itself (from GO gel), and the pyrolytic graphite are three fundamentally different and patently distinct classes of materials in terms of chemical composition, morphology, structure, process of production, and various properties.

In conclusion, we have successfully developed an absolutely new, novel, unexpected, and patently distinct class of highly conducting material: graphene oxide gel-derived unitary graphene matrix composite. The chemical composition, structure, morphology, process of production, and properties of this new class of materials are fundamentally different and patently distinct from flexible graphite foil, polymer-derived pyrolytic graphite, CVD-derived PG (including HOPG), and catalytic CVD graphene thin film. The thermal conductivity, electrical conductivity, scratch resistance, surface hardness, and tensile strength exhibited by the presently invented materials are much higher than what prior art flexible graphite sheets, graphene or GO paper, or other graphitic films could possibly achieve. These GO-derived unitary graphene materials have the best combination of excellent electrical conductivity, thermal conductivity, mechanical strength, surface scratch resistance, hardness, and no tendency to flake off.

We claim:
1. A unitary graphene matrix composite comprising:
(a) A unitary graphene matrix containing closely packed and chemically bonded graphene planes having an inter-graphene plane spacing of 0.335 to 0.40 nm and an oxygen content of 0.001% to 10% by weight, which unitary graphene matrix is obtained from heat-treating a graphene oxide gel at a temperature higher than 100° C. and contains no discrete graphene platelets derived from said graphene oxide gel; and
(b) A carbon or graphite filler phase selected from a carbon or graphite fiber, carbon or graphite nano-fiber, carbon nano-tube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof;

wherein said carbon or graphite filler phase occupies a weight fraction of 0.01% to 99% based on the total composite weight and said carbon or graphite filler phase is in a particulate, filamentary, or rod-like form dispersed in said unitary graphene matrix.

2. The unitary graphene matrix composite of claim 1, wherein said chemically bonded graphene planes are parallel to one another.

3. The unitary graphene matrix composite of claim 1, wherein said unitary graphene matrix contains no complete grain boundary therein.

4. The unitary graphene matrix composite of claim 1, wherein said carbon or graphite filler is chemically bonded by said unitary graphene matrix.

5. The unitary graphene matrix composite of claim 1, having a physical density of at least 1.5 g/cm$^3$ or a porosity level lower than 20%.

6. The unitary graphene matrix composite of claim 1, having a physical density of at least 1.7 g/cm$^3$ or a porosity level lower than 10%.

7. The unitary graphene matrix composite of claim 1, wherein the chemically bonded graphene planes contain a combination of sp$^2$ and sp$^3$ electronic configurations.

8. The unitary graphene matrix composite of claim 1, wherein said carbon or graphite filler is in a form of porous woven fabric, porous non-woven fabric, porous mat, or porous paper, and said composite is made by impregnating said porous woven fabric, porous non-woven fabric, porous mat, or porous paper with said graphene oxide gel prior to heat treating.

9. The unitary graphene matrix composite of claim 1, wherein said carbon or graphite filler is in a form of fiber yarns or fiber bundles impregnated with said graphene oxide gel and said composite is made by forming said fiber yarns or bundles into a desired shape prior to heat treating.

10. The unitary graphene matrix composite of claim 9, wherein said desired shape is selected from a unidirectional, bi-directional, multi-directional, angle-plied, woven, or filament-wound shape.

11. The unitary graphene matrix composite of claim 1, wherein said carbon or graphite filler phase occupies a weight fraction from 0.1% to 70% based on the total composite weight and said unitary graphene matrix forms a continuous phase.

12. The unitary graphene matrix composite of claim 1, wherein said unitary graphene matrix has an oxygen content from 0.01% to 5% by weight.

13. The unitary graphene matrix composite of claim 1, wherein said graphene oxide gel is composed of graphene oxide molecules dispersed in an acidic medium having a pH value of no higher than 5 and said graphene oxide molecules have an oxygen content no less than 20% by weight while in a gel state.

14. The unitary graphene matrix composite of claim 1, wherein said graphene oxide gel is obtained by immersing a graphitic material in a powder or fibrous form in an oxidizing liquid medium in a reaction vessel at a reaction temperature for a length of time sufficient to obtain a graphene oxide gel composed of graphene oxide molecules dispersed in the liquid medium and said graphene oxide molecules have an oxygen content no less than 20% by weight and a molecular weight less than 43,000 g/mole while in a gel state.

15. The unitary graphene matrix composite of claim 13, wherein said graphene oxide molecules have a molecular weight less than 4,000 g/mole while in a gel state.

16. The unitary graphene matrix composite of claim 13, wherein said graphene oxide molecules have a molecular weight between 200 g/mole and 4,000 g/mole while in a gel state.

17. The unitary graphene matrix composite of claim 1, which is produced by (a) depositing or dispensing a mixture of graphene oxide gel and carbon or graphite phase onto a substrate surface or into a mold cavity, (b) removing a residual liquid from said mixture to form a precursor composite; and (c) subjecting said precursor composite to a heat treatment at a temperature of at least 150° C. for thermal reduction and/or re-graphitization of the graphene oxide to form a continuous graphene matrix.

18. The unitary graphene matrix composite of claim 17, wherein said heat treatment temperature is at least 1,500° C.

19. The unitary graphene matrix composite of claim 17, wherein said heat treatment temperature is at least 2,500° C.

20. The unitary graphene matrix composite of claim 1, wherein said graphene oxide gel is produced from oxidation of a graphitic material selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

21. The unitary graphene matrix composite of claim 1, wherein said filler contains elongated-shape or filamentary particles selected from carbon or graphite fibers, carbon or graphite nano-fibers, carbon nano-tubes, carbon nano-rods, and/or needle coke particles which have a length and a diameter or thickness, and said elongated-shape or filamentary particles are aligned along a length direction so that the composite is anisotropic having an anisotropy ratio greater than 10, wherein the anisotropy ratio is defined as a length-direction property-to-thickness-direction property ratio and said property is selected from electrical conductivity, thermal conductivity, strength, or modulus.

22. The unitary graphene matrix composite of claim 21, wherein said anisotropy ratio is greater than 100.

23. The unitary graphene matrix composite of claim 21, wherein said anisotropy ratio is less than 10.

24. The unitary graphene matrix composite of claim 21, wherein said anisotropy ratio is less than 2.

25. A unitary graphene matrix composite comprising:
(a) A unitary graphene matrix containing graphene planes having an inter-graphene plane spacing from 0.335 to 0.40 nm and an oxygen content from 0.001% to 6.2% by weight, which unitary graphene matrix is obtained from heat-treating a graphene oxide gel at a temperature higher than 500° C. and contains no discrete graphene platelets derived from said graphene oxide gel;
(b) A carbon or graphite filler phase selected from a carbon or graphite fiber, carbon or graphite nano-fiber, carbon nano-tube, carbon nano-rod, meso-phase carbon particle, meso-carbon micro-bead, exfoliated graphite flake with a thickness greater than 100 nm, exfoliated graphite or graphite worm, coke particle, needle coke, carbon black or acetylene black particle, activated carbon particle, or a combination thereof;
wherein said carbon or graphite filler phase occupies a weight fraction from 1% to 90% based on the total composite weight and said carbon or graphite filler phase is in a particulate, filamentary, or rod-like form dispersed in said unitary graphene matrix which forms a continuous phase and wherein said carbon or graphite filler is chemically bonded by said unitary graphene matrix.

26. A process for producing the unitary graphene matrix composite of claim 1, said process comprising: (a) preparing a graphene oxide gel having graphene oxide molecules dispersed in a fluid medium, wherein the graphene oxide gel is optically transparent or translucent; (b) mixing said carbon or graphite filler phase in said graphene oxide gel to form a slurry; (c) dispensing said slurry onto a surface of a supporting substrate or a cavity of a molding tool; (d) partially or completely removing said fluid medium from the slurry to form a composite precursor; and (e) heat-treating the composite precursor to form said unitary graphene composite at a temperature higher than 100° C.

27. A process for producing the unitary graphene matrix composite of claim 1, said process comprising: (a) preparing a graphene oxide gel having graphene oxide molecules dispersed in a fluid medium, wherein the graphene oxide gel is optically transparent or translucent; (b) forming said carbon or graphite filler phase into a desired porous shape having pores therein, and impregnating said graphene oxide gel into said pores of the desired porous shape to form an impregnated shape; (c) partially or completely removing said fluid medium from the impregnated shape to form a composite precursor; and (d) heat-treating the composite precursor to form said unitary graphene composite at a temperature higher than 100° C.

28. The process of claim 27, wherein said desired porous shape is a porous woven fabric, porous non-woven fabric, porous mat, or porous paper.

29. A process for producing the unitary graphene matrix composite of claim 1, said process comprising: (a) preparing a graphene oxide gel having graphene oxide molecules dispersed in a fluid medium, wherein the graphene oxide gel is optically transparent or translucent; (b) combining said carbon or graphite filler phase and said graphene oxide gel to form a graphene oxide gel-impregnated shape of fiber yarns or bundles; (c) partially or completely removing said fluid medium from graphene oxide gel-impregnated shape to form a composite precursor; and (d) heat-treating the composite precursor to form said unitary graphene composite at a temperature higher than 100° C.

30. The process of claim 29, wherein said graphene oxide gel-impregnated shape is selected from a unidirectional, bi-directional, multi-directional, angle-plied, woven, or filament-wound shape.

31. The process of claim 26, wherein said graphene oxide gel is prepared by immersing a graphitic material in a powder or fibrous form in an oxidizing liquid to form an optically opaque suspension in a reaction vessel at a reaction temperature for a length of time sufficient to obtain a graphene oxide gel that is optically transparent or translucent, wherein said graphene oxide gel is composed of graphene oxide molecules dispersed in an acidic medium having a pH value of no higher than 5 and said graphene oxide molecules have an oxygen content no less than 20% by weight.

32. The process of claim 27, wherein said graphene oxide gel is prepared by immersing a graphitic material in an oxidizing agent to form an optically opaque suspension and allowing an oxidizing reaction to proceed until an optically transparent or translucent solution is formed, and wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

33. The process of claim 26, further comprising a step of compressing said composite precursor prior to or during heat treating.

34. The process of claim 27, further comprising a step of compressing said composite precursor prior to or during heat treating.

35. The process of claim 29, further comprising a step of compressing said composite precursor prior to or during heat treating.

36. The process of claim 26, wherein said steps (c) and (d) include feeding a sheet of a solid substrate material from a roller to a deposition zone, dispensing said slurry or suspension onto a surface of said sheet of solid substrate material to form a slurry layer thereon, drying said slurry or suspension to form a dried composite precursor layer deposited on said substrate surface, and collecting composite precursor-deposited substrate sheet on a collector roller.

37. The process of claim 36, further comprising a step of compressing said composite precursor prior to being collected on said collector roller.

* * * * *